US011900324B2

United States Patent
Lo et al.

(10) Patent No.: US 11,900,324 B2
(45) Date of Patent: *Feb. 13, 2024

(54) MANAGING PROJECTS IN A CONTENT MANAGEMENT SYSTEM

(71) Applicant: Dropbox, Inc., San Francisco, CA (US)

(72) Inventors: Min Ming Lo, Palo Alto, CA (US); Matteus Pan, San Francisco, CA (US); Linjie Ding, San Mateo, CA (US); Lilian Weng, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/302,370

(22) Filed: Apr. 30, 2021

(65) Prior Publication Data

US 2021/0256475 A1   Aug. 19, 2021

Related U.S. Application Data

(63) Continuation of application No. 16/525,811, filed on Jul. 30, 2019, now Pat. No. 11,017,354, which is a
(Continued)

(51) Int. Cl.
*G06Q 10/00* (2023.01)
*G06Q 30/00* (2023.01)
(Continued)

(52) U.S. Cl.
CPC ......... *G06Q 10/103* (2013.01); *G06F 16/164* (2019.01); *G06Q 10/04* (2013.01);
(Continued)

(58) Field of Classification Search
USPC ........................................................ 709/204
See application file for complete search history.

(56) References Cited

U.S. PATENT DOCUMENTS

| 5,634,129 A | 5/1997 | Dickinson et al. |
| 6,370,567 B1 | 4/2002 | Ouchi |

(Continued)

FOREIGN PATENT DOCUMENTS

| AU | 2016201019 A1 | 10/2016 |
| AU | 2016201472 A1 | 10/2016 |

(Continued)

OTHER PUBLICATIONS

Communication Pursuant to Article 94(3) EPC for European Application No. 20167778.8 dated Jul. 29, 2021, 9 pages.
(Continued)

*Primary Examiner* — Jude Jean Gilles
(74) *Attorney, Agent, or Firm* — DLA PIPER LLP (US)

(57) ABSTRACT

Disclosed are systems, methods, and non-transitory computer-readable storage media for managing projects in a content management system. For example, the content management system can create a project folder (e.g., shared folder) for managing data associated with a project. The project folder can be shared with content management system users (e.g., project members) who are contributors to the project. The content management system can store project data (e.g., content items, communications, comments, tasks, etc.) related to the project in the project folder. When the project folder is selected by a user, the content management system can generate a project folder view that presents the project data associated with the project folder and/or project in a convenient and easy to access graphical user interface. The content management system can aggregate project data from various content items associated with the project and present the project data in a single graphical user interface.

20 Claims, 22 Drawing Sheets

Related U.S. Application Data continuation of application No. 15/395,220, filed on Dec. 30, 2016, now Pat. No. 10,402,786.

(51) Int. Cl.
  *G06F 16/16* (2019.01)
  *G06Q 10/10* (2023.01)
  *G06Q 10/04* (2023.01)
  *G06Q 10/06* (2023.01)
  *G06Q 10/08* (2023.01)
  *G06Q 10/0631* (2023.01)
  *G06Q 10/0633* (2023.01)
  *G06F 15/16* (2006.01)

(52) U.S. Cl.
  CPC ......... *G06Q 10/06* (2013.01); *G06Q 10/0633* (2013.01); *G06Q 10/063118* (2013.01); *G06Q 10/08* (2013.01); *G06Q 10/10* (2013.01)

(56) References Cited

U.S. PATENT DOCUMENTS

| | | |
|---|---|---|
| 6,505,236 B1 | 1/2003 | Pollack et al. |
| 6,839,741 B1 | 1/2005 | Tsai et al. |
| 6,970,906 B1 | 11/2005 | Parsons et al. |
| 7,039,678 B1 | 5/2006 | Halahmi et al. |
| 7,062,532 B1* | 6/2006 | Sweat .................. G06Q 10/10 709/225 |
| 7,543,237 B2 | 6/2009 | Kontny et al. |
| 7,546,317 B1* | 6/2009 | Kaptelinin ............ G06Q 10/10 707/999.2 |
| 7,689,510 B2 | 3/2010 | Lamkin et al. |
| 7,693,958 B2 | 4/2010 | Teodosiu et al. |
| 7,774,710 B2 | 8/2010 | Krishnan et al. |
| 7,865,394 B1 | 1/2011 | Calloway et al. |
| 7,970,850 B1 | 6/2011 | Callanan et al. |
| 8,015,491 B2 | 9/2011 | Shaver et al. |
| 8,117,271 B2 | 2/2012 | McConn et al. |
| 8,122,015 B2 | 2/2012 | Liu et al. |
| 8,122,051 B2 | 2/2012 | Spring et al. |
| 8,161,120 B2 | 4/2012 | Tan et al. |
| 8,214,747 B1 | 7/2012 | Yankovich et al. |
| 8,245,141 B1 | 8/2012 | Fuller et al. |
| 8,250,150 B2 | 8/2012 | Beck et al. |
| 8,316,128 B2 | 11/2012 | Beck et al. |
| 8,332,357 B1 | 12/2012 | Chung |
| 8,341,532 B2 | 12/2012 | Ryan et al. |
| 8,392,472 B1* | 3/2013 | Gupta .................... G06F 16/16 707/804 |
| 8,438,185 B2 | 5/2013 | Teranishi et al. |
| 8,533,268 B1 | 9/2013 | Vernon et al. |
| 8,543,926 B2 | 9/2013 | Giles et al. |
| 8,584,022 B1* | 11/2013 | O'Shaughnessy .... G06F 3/0482 715/752 |
| 8,639,552 B1* | 1/2014 | Chen .................... G06Q 10/107 705/7.21 |
| 8,666,991 B2 | 3/2014 | Peters et al. |
| 8,700,719 B1 | 4/2014 | Covitz et al. |
| 8,713,106 B2 | 4/2014 | Spataro et al. |
| 8,745,222 B2 | 6/2014 | Chi et al. |
| 8,793,324 B1 | 7/2014 | Schabes et al. |
| 8,819,587 B1 | 8/2014 | Shrum et al. |
| 8,892,679 B1 | 11/2014 | Destagnol et al. |
| 8,918,365 B2 | 12/2014 | Skrenta et al. |
| 8,924,876 B1 | 12/2014 | Joyce et al. |
| 8,930,412 B2 | 1/2015 | Nelson et al. |
| 8,977,662 B1 | 3/2015 | Hilliar |
| 8,977,722 B2 | 3/2015 | Tsao |
| 8,990,151 B2 | 3/2015 | Savage et al. |
| 9,002,962 B2 | 4/2015 | Lynch et al. |
| 9,166,954 B2 | 10/2015 | Swineford et al. |
| 9,230,241 B1 | 1/2016 | Singh et al. |
| 9,235,268 B2 | 1/2016 | Arrasvuori et al. |
| 9,240,962 B2 | 1/2016 | Jung et al. |
| 9,251,360 B2 | 2/2016 | Meyer et al. |
| 9,252,973 B1 | 2/2016 | Lin et al. |
| 9,298,355 B1 | 3/2016 | Beausoleil et al. |
| 9,300,609 B1 | 3/2016 | Beausoleil et al. |
| 9,395,892 B1 | 7/2016 | Beausoleil et al. |
| 9,395,893 B1 | 7/2016 | Beausoleil et al. |
| 9,477,760 B2 | 10/2016 | Xie et al. |
| 9,542,391 B1 | 1/2017 | Eisner et al. |
| 9,584,565 B1 | 2/2017 | Ho et al. |
| 9,588,979 B2 | 3/2017 | Cueto et al. |
| 9,641,488 B2 | 5/2017 | Mityagin et al. |
| 9,747,297 B2 | 8/2017 | Penangwala et al. |
| 9,773,051 B2 | 9/2017 | Smith |
| 9,978,040 B2 | 5/2018 | Lee et al. |
| 9,990,365 B1 | 6/2018 | Kilpatrick et al. |
| 10,320,727 B1 | 6/2019 | Mesters et al. |
| 10,402,786 B2* | 9/2019 | Lo .......................... G06Q 10/10 |
| 10,719,807 B2 | 7/2020 | Newhouse et al. |
| 10,796,012 B2 | 10/2020 | Birkel et al. |
| 10,970,656 B2 | 4/2021 | Newhouse et al. |
| 11,017,354 B2* | 5/2021 | Lo .......................... G06Q 10/103 |
| 2002/0120485 A1 | 8/2002 | Kirkconnell-Ewing et al. |
| 2002/0138582 A1 | 9/2002 | Chandra et al. |
| 2003/0009536 A1 | 1/2003 | Henderson et al. |
| 2003/0018622 A1 | 1/2003 | Chau |
| 2003/0046134 A1 | 3/2003 | Frolick et al. |
| 2003/0065722 A1 | 4/2003 | Ieperen |
| 2003/0131062 A1 | 7/2003 | Miyashita et al. |
| 2003/0135565 A1 | 7/2003 | Estrada |
| 2003/0163490 A1 | 8/2003 | Kitamura |
| 2004/0083480 A1 | 4/2004 | Dodge et al. |
| 2004/0117445 A9 | 6/2004 | Lee et al. |
| 2004/0141508 A1 | 7/2004 | Schoeneberger et al. |
| 2004/0162878 A1 | 8/2004 | Lewis et al. |
| 2004/0187140 A1 | 9/2004 | Aigner et al. |
| 2004/0225647 A1 | 11/2004 | Connelly et al. |
| 2004/0230599 A1 | 11/2004 | Moore et al. |
| 2004/0236639 A1 | 11/2004 | Candadai et al. |
| 2005/0022931 A1 | 2/2005 | Min et al. |
| 2005/0028008 A1 | 2/2005 | Kumar |
| 2005/0091289 A1 | 4/2005 | Shappell et al. |
| 2005/0097440 A1 | 5/2005 | Lusk et al. |
| 2005/0108293 A1 | 5/2005 | Lipman et al. |
| 2005/0151756 A1 | 7/2005 | Miyamoto et al. |
| 2005/0172226 A1* | 8/2005 | Kobashi ............... G06F 40/103 715/745 |
| 2005/0182773 A1 | 8/2005 | Feinsmith |
| 2005/0198125 A1 | 9/2005 | Macleod et al. |
| 2005/0198299 A1 | 9/2005 | Beck et al. |
| 2005/0222931 A1 | 10/2005 | Mamou et al. |
| 2005/0223024 A1* | 10/2005 | Hyun .................... G06F 16/168 707/999.102 |
| 2005/0223315 A1 | 10/2005 | Shimizu et al. |
| 2006/0004685 A1 | 1/2006 | Pyhalammi et al. |
| 2006/0020904 A1 | 1/2006 | Aaltonen et al. |
| 2006/0026213 A1 | 2/2006 | Yaskin et al. |
| 2006/0064434 A1 | 3/2006 | Gilbert et al. |
| 2006/0080432 A1 | 4/2006 | Spataro et al. |
| 2006/0101443 A1* | 5/2006 | Nasr ......................... G06F 8/71 717/123 |
| 2006/0136821 A1 | 6/2006 | Barabe et al. |
| 2006/0265377 A1 | 11/2006 | Raman et al. |
| 2007/0033088 A1 | 2/2007 | Aigner et al. |
| 2007/0050324 A1 | 3/2007 | Trinkel et al. |
| 2007/0067726 A1 | 3/2007 | Flynt et al. |
| 2007/0100829 A1 | 5/2007 | Allen et al. |
| 2007/0101294 A1 | 5/2007 | Fong et al. |
| 2007/0150551 A1 | 6/2007 | Krishnan et al. |
| 2007/0179958 A1 | 8/2007 | Chen et al. |
| 2007/0276795 A1 | 11/2007 | Poulsen et al. |
| 2007/0277098 A1 | 11/2007 | Shahar et al. |
| 2007/0288839 A1 | 12/2007 | Kurosawa et al. |
| 2008/0028323 A1 | 1/2008 | Rosen et al. |
| 2008/0036794 A1 | 2/2008 | Weiser et al. |
| 2008/0077614 A1 | 3/2008 | Roy et al. |
| 2008/0091761 A1 | 4/2008 | Tsao |
| 2008/0120382 A1 | 5/2008 | Heidloff et al. |
| 2008/0140732 A1 | 6/2008 | Wilson et al. |
| 2008/0177994 A1 | 7/2008 | Mayer |

(56) References Cited

U.S. PATENT DOCUMENTS

| | | |
|---|---|---|
| 2008/0195659 A1 | 8/2008 | Rawle |
| 2008/0201422 A1 | 8/2008 | Peccora et al. |
| 2008/0256458 A1 | 10/2008 | Aldred et al. |
| 2008/0288453 A1 | 11/2008 | Smetters et al. |
| 2009/0013043 A1 | 1/2009 | Tan |
| 2009/0044146 A1 | 2/2009 | Patel et al. |
| 2009/0064284 A1 | 3/2009 | Poston et al. |
| 2009/0131116 A1 | 5/2009 | Tsuchiya et al. |
| 2009/0138808 A1 | 5/2009 | Moromisato et al. |
| 2009/0172281 A1 | 7/2009 | Jogand-Coulomb et al. |
| 2009/0177754 A1 | 7/2009 | Brezina et al. |
| 2009/0235182 A1 | 9/2009 | Kagawa et al. |
| 2009/0249244 A1 | 10/2009 | Robinson et al. |
| 2009/0282421 A1 | 11/2009 | Jaffer et al. |
| 2009/0307605 A1 | 12/2009 | Ryan et al. |
| 2009/0307622 A1 | 12/2009 | Jalon et al. |
| 2009/0319694 A1 | 12/2009 | Slezak et al. |
| 2009/0327405 A1 | 12/2009 | Fitzgerald et al. |
| 2009/0327936 A1 | 12/2009 | Wong et al. |
| 2010/0024011 A1 | 1/2010 | Fukuoka |
| 2010/0070448 A1 | 3/2010 | Omoigui |
| 2010/0082713 A1 | 4/2010 | Frid-Nielsen et al. |
| 2010/0095198 A1 | 4/2010 | Bultrowicz et al. |
| 2010/0151431 A1 | 6/2010 | Miller et al. |
| 2910/0138503 | 6/2010 | Ishikawa et al. |
| 2010/0180196 A1 | 7/2010 | Matsusaka |
| 2010/0211621 A1 | 8/2010 | Hariharan et al. |
| 2010/0241711 A1 | 9/2010 | Ansari et al. |
| 2010/0250497 A1 | 9/2010 | Redlich et al. |
| 2010/0262435 A1 | 10/2010 | Smith et al. |
| 2010/0287221 A1 | 11/2010 | Battepati et al. |
| 2010/0293021 A1* | 11/2010 | Van Styn ............... G06Q 10/06 707/E17.014 |
| 2010/0299763 A1 | 11/2010 | Marcus et al. |
| 2010/0317420 A1 | 12/2010 | Hoffberg |
| 2011/0014524 A1 | 1/2011 | Skotheim et al. |
| 2011/0022662 A1 | 1/2011 | Barber-Mingo et al. |
| 2011/0054968 A1* | 3/2011 | Galaviz ................ G06Q 10/10 705/7.41 |
| 2011/0066948 A1* | 3/2011 | Tsao ...................... G06F 16/972 715/739 |
| 2011/0069643 A1 | 3/2011 | Yoakum et al. |
| 2011/0083090 A1* | 4/2011 | Gwiazda ............... G06F 16/958 715/769 |
| 2011/0119101 A1 | 5/2011 | Drury |
| 2011/0119353 A1 | 5/2011 | Tsao |
| 2011/0145245 A1 | 6/2011 | Choi et al. |
| 2011/0154209 A1 | 6/2011 | Fan et al. |
| 2011/0173081 A1 | 7/2011 | Crucs |
| 2011/0185015 A1* | 7/2011 | Stolper ............... G06Q 30/0603 709/203 |
| 2011/0202430 A1 | 8/2011 | Narayanan et al. |
| 2011/0214088 A1 | 9/2011 | Sandru et al. |
| 2011/0249024 A1 | 10/2011 | Arrasvuori et al. |
| 2011/0252375 A1* | 10/2011 | Chaudhri ............ G06F 3/04886 715/835 |
| 2011/0258554 A1 | 10/2011 | Sidenur et al. |
| 2011/0258561 A1 | 10/2011 | Ladouceur et al. |
| 2011/0276897 A1 | 11/2011 | Crevier et al. |
| 2011/0289054 A1* | 11/2011 | Johnson ................ G06F 21/604 707/626 |
| 2012/0036016 A1 | 2/2012 | Hoffberg et al. |
| 2012/0054639 A1 | 3/2012 | Shi et al. |
| 2012/0079389 A1 | 3/2012 | Tsao |
| 2012/0089565 A1 | 4/2012 | Jackson |
| 2012/0089610 A1 | 4/2012 | Agrawal et al. |
| 2012/0110515 A1* | 5/2012 | Abramoff ............ G06F 16/904 715/854 |
| 2012/0124092 A1 | 5/2012 | Teranishi et al. |
| 2012/0136936 A1 | 5/2012 | Quintuna |
| 2012/0143917 A1 | 6/2012 | Prabaker et al. |
| 2012/0151379 A1 | 6/2012 | Schultz et al. |
| 2012/0158461 A1 | 6/2012 | Aldrey et al. |
| 2012/0182384 A1 | 7/2012 | Anderson et al. |
| 2012/0185800 A1 | 7/2012 | Hart et al. |
| 2012/0192086 A1 | 7/2012 | Ghods et al. |
| 2012/0221520 A1 | 8/2012 | Garrett et al. |
| 2012/0278388 A1 | 11/2012 | Kleinbart et al. |
| 2012/0284290 A1 | 11/2012 | Keebler et al. |
| 2012/0284638 A1 | 11/2012 | Cutler et al. |
| 2012/0287020 A1 | 11/2012 | Utsuki et al. |
| 2012/0290531 A1 | 11/2012 | Kallakuri et al. |
| 2012/0290935 A1 | 11/2012 | Ihara et al. |
| 2012/0290951 A1 | 11/2012 | Utsuki et al. |
| 2012/0296946 A1 | 11/2012 | Goto |
| 2012/0297341 A1 | 11/2012 | Glazer et al. |
| 2012/0311060 A1 | 12/2012 | Beck et al. |
| 2012/0311492 A1 | 12/2012 | Omholt et al. |
| 2012/0317239 A1 | 12/2012 | Mulder et al. |
| 2012/0331108 A1 | 12/2012 | Ferdowsi et al. |
| 2013/0013560 A1 | 1/2013 | Goldberg et al. |
| 2013/0014023 A1 | 1/2013 | Lee et al. |
| 2013/0024788 A1 | 1/2013 | Olsen et al. |
| 2013/0031147 A1 | 1/2013 | Ghods et al. |
| 2013/0054613 A1 | 2/2013 | Bishop |
| 2013/0073971 A1 | 3/2013 | Huang et al. |
| 2013/0074191 A1 | 3/2013 | Ben-Reuven |
| 2013/0080919 A1 | 3/2013 | Kiang et al. |
| 2013/0086506 A1 | 4/2013 | Molander et al. |
| 2013/0091440 A1 | 4/2013 | Kotler et al. |
| 2013/0110641 A1 | 5/2013 | Ormont et al. |
| 2013/0117060 A1 | 5/2013 | Henriksen et al. |
| 2013/0117376 A1 | 5/2013 | Filman et al. |
| 2013/0124638 A1 | 5/2013 | Barreto et al. |
| 2013/0132814 A1 | 5/2013 | Mangini et al. |
| 2013/0138506 A1 | 5/2013 | Zhu et al. |
| 2013/0138608 A1 | 5/2013 | Smith |
| 2013/0138723 A1 | 5/2013 | Ku et al. |
| 2013/0173798 A1 | 7/2013 | Micucci et al. |
| 2013/0179799 A1 | 7/2013 | Savage |
| 2013/0191339 A1 | 7/2013 | Haden et al. |
| 2013/0198600 A1 | 8/2013 | Lockhart et al. |
| 2013/0205251 A1 | 8/2013 | Cisler et al. |
| 2013/0212112 A1 | 8/2013 | Blom et al. |
| 2013/0218596 A1 | 8/2013 | Gome et al. |
| 2013/0218829 A1* | 8/2013 | Martinez ................ G06Q 10/10 707/608 |
| 2013/0227015 A1 | 8/2013 | Mihara et al. |
| 2013/0246901 A1 | 9/2013 | Massand |
| 2013/0254699 A1 | 9/2013 | Bashir et al. |
| 2013/0262210 A1 | 10/2013 | Savage et al. |
| 2013/0268895 A1 | 10/2013 | Yamaki et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0297317 A1 | 11/2013 | Lee et al. |
| 2013/0297680 A1 | 11/2013 | Smith et al. |
| 2013/0297700 A1 | 11/2013 | Hayton et al. |
| 2013/0305165 A1 | 11/2013 | Zuber et al. |
| 2013/0311557 A1 | 11/2013 | Motes et al. |
| 2013/0346394 A1* | 12/2013 | Ludvigsen ............ G06F 16/248 707/722 |
| 2014/0006784 A1 | 1/2014 | Walker et al. |
| 2014/0012836 A1 | 1/2014 | Bercovici et al. |
| 2014/0013246 A1 | 1/2014 | Beechuk et al. |
| 2014/0025509 A1 | 1/2014 | Reisz et al. |
| 2014/0029751 A1 | 1/2014 | Swineford et al. |
| 2014/0047560 A1 | 2/2014 | Meyer et al. |
| 2014/0067934 A1 | 3/2014 | Ware et al. |
| 2014/0068401 A1 | 3/2014 | Kirigin |
| 2014/0082073 A1 | 3/2014 | Wable et al. |
| 2014/0082101 A1 | 3/2014 | Wable et al. |
| 2014/0089406 A1 | 3/2014 | Gniffke et al. |
| 2014/0108085 A1 | 4/2014 | Henriksen et al. |
| 2014/0132702 A1 | 5/2014 | Leibovich et al. |
| 2014/0133632 A1 | 5/2014 | Wakai et al. |
| 2014/0136989 A1 | 5/2014 | Choi et al. |
| 2014/0156416 A1 | 6/2014 | Goenka et al. |
| 2014/0156806 A1* | 6/2014 | Karpistsenko ...... H04L 67/2885 709/219 |
| 2014/0164535 A1 | 6/2014 | Lynch et al. |
| 2014/0165006 A1* | 6/2014 | Chaudhri ............ G06F 3/04817 715/835 |

(56) References Cited

U.S. PATENT DOCUMENTS

| | | |
|---|---|---|
| 2014/0172925 A1 | 6/2014 | Goldbrenner et al. |
| 2014/0172997 A1 | 6/2014 | Chan et al. |
| 2014/0181013 A1 | 6/2014 | Micucci et al. |
| 2014/0181213 A1 | 6/2014 | Hunter et al. |
| 2014/0181697 A1 | 6/2014 | Kirigin |
| 2014/0188790 A1 | 7/2014 | Hunter et al. |
| 2014/0189818 A1 | 7/2014 | Meyer |
| 2014/0195885 A1 | 7/2014 | Thiruvidam et al. |
| 2014/0200944 A1 | 7/2014 | Henriksen et al. |
| 2014/0201126 A1 | 7/2014 | Zadeh et al. |
| 2014/0208220 A1 | 7/2014 | Watal |
| 2014/0210756 A1 | 7/2014 | Lee et al. |
| 2014/0215551 A1 | 7/2014 | Allain et al. |
| 2014/0215568 A1 | 7/2014 | Kirigin et al. |
| 2014/0222701 A1 | 8/2014 | Loh et al. |
| 2014/0222917 A1 | 8/2014 | Poirier |
| 2014/0229839 A1 | 8/2014 | Lynch et al. |
| 2014/0237464 A1 | 8/2014 | Waterman et al. |
| 2014/0280602 A1 | 9/2014 | Quatrano |
| 2014/0281870 A1 | 9/2014 | Vogel et al. |
| 2014/0282188 A1* | 9/2014 | Hathaway .................. G06F 8/34 715/771 |
| 2014/0282222 A1 | 9/2014 | Eim et al. |
| 2014/0289351 A1 | 9/2014 | Chen et al. |
| 2014/0289360 A1 | 9/2014 | Mahkovec et al. |
| 2014/0289645 A1 | 9/2014 | Megiddo et al. |
| 2014/0289658 A1 | 9/2014 | Gelernter et al. |
| 2014/0294167 A1 | 10/2014 | Kim et al. |
| 2014/0297759 A1 | 10/2014 | Mody |
| 2014/0298207 A1 | 10/2014 | Ittah et al. |
| 2014/0304618 A1 | 10/2014 | Carriero et al. |
| 2014/0304836 A1 | 10/2014 | Velamoor et al. |
| 2014/0316898 A1 | 10/2014 | Russell et al. |
| 2014/0317544 A1 | 10/2014 | Wang |
| 2014/0325016 A1 | 10/2014 | Chen et al. |
| 2014/0330776 A1 | 11/2014 | Chen |
| 2014/0344739 A1 | 11/2014 | Yoon |
| 2014/0359023 A1 | 12/2014 | Homsany |
| 2014/0359085 A1 | 12/2014 | Chen |
| 2014/0359465 A1 | 12/2014 | Litan et al. |
| 2014/0365263 A1 | 12/2014 | Honeyman et al. |
| 2014/0365432 A1 | 12/2014 | Jain et al. |
| 2014/0372539 A1 | 12/2014 | Zaveri |
| 2014/0372923 A1 | 12/2014 | Rossi et al. |
| 2014/0378063 A1 | 12/2014 | Nathwani et al. |
| 2014/0379647 A1 | 12/2014 | Smith et al. |
| 2014/0380232 A1 | 12/2014 | Sarnoff et al. |
| 2015/0006596 A1 | 1/2015 | Fukui et al. |
| 2015/0019480 A1 | 1/2015 | Maquaire et al. |
| 2015/0019654 A1 | 1/2015 | Wheeler et al. |
| 2015/0026260 A1 | 1/2015 | Worthley et al. |
| 2015/0026604 A1 | 1/2015 | Mulukuri et al. |
| 2015/0032692 A1 | 1/2015 | Litzenberger |
| 2015/0032829 A1 | 1/2015 | Barshow et al. |
| 2015/0033305 A1 | 1/2015 | Shear et al. |
| 2015/0058751 A1 | 2/2015 | Tseng |
| 2015/0074044 A1 | 3/2015 | Metreveli et al. |
| 2015/0074520 A1 | 3/2015 | Muto et al. |
| 2015/0082224 A1* | 3/2015 | Hathaway ............... G06F 9/451 715/771 |
| 2015/0095799 A1 | 4/2015 | Tsao |
| 2015/0100889 A1 | 4/2015 | Tuchman et al. |
| 2015/0120835 A1 | 4/2015 | Schroeder |
| 2015/0120859 A1 | 4/2015 | Kondo et al. |
| 2015/0127628 A1 | 5/2015 | Rathod et al. |
| 2015/0134751 A1 | 5/2015 | Meyers, Jr. et al. |
| 2015/0134808 A1 | 5/2015 | Fushman et al. |
| 2015/0135097 A1 | 5/2015 | Carriero et al. |
| 2015/0135300 A1 | 5/2015 | Ford |
| 2015/0148093 A1 | 5/2015 | Huang et al. |
| 2015/0149177 A1 | 5/2015 | Kalns et al. |
| 2015/0149929 A1 | 5/2015 | Shepherd et al. |
| 2015/0156274 A1 | 6/2015 | Alten et al. |
| 2015/0169566 A1 | 6/2015 | Yang et al. |
| 2015/0186538 A1 | 7/2015 | Yan et al. |
| 2015/0188960 A1 | 7/2015 | Alhaidar et al. |
| 2015/0200885 A1 | 7/2015 | Sharp et al. |
| 2015/0200945 A1 | 7/2015 | Edson et al. |
| 2015/0213037 A1 | 7/2015 | Baldwin et al. |
| 2015/0213397 A1* | 7/2015 | Arena ............ G06Q 10/063118 705/7.17 |
| 2015/0286371 A1 | 10/2015 | Degani et al. |
| 2015/0288775 A1 | 10/2015 | Larabie-Belanger |
| 2015/0304265 A1 | 10/2015 | Vincent et al. |
| 2015/0341399 A1 | 11/2015 | Lee |
| 2015/0358303 A1 | 12/2015 | Hui et al. |
| 2016/0028796 A1 | 1/2016 | Garcia et al. |
| 2016/0034844 A1 | 2/2016 | Kofman |
| 2016/0085421 A1 | 3/2016 | Feeney |
| 2016/0094495 A1 | 3/2016 | Ahuja et al. |
| 2016/0127452 A1 | 5/2016 | Newman et al. |
| 2016/0140139 A1 | 5/2016 | Torres et al. |
| 2016/0179754 A1 | 6/2016 | Borza et al. |
| 2016/0247245 A1 | 8/2016 | Baic et al. |
| 2016/0259508 A1 | 9/2016 | Eccleston et al. |
| 2016/0277537 A1 | 9/2016 | Liang et al. |
| 2016/0283085 A1 | 9/2016 | Beausoleil et al. |
| 2016/0283502 A1 | 9/2016 | Beausoleil et al. |
| 2016/0283567 A1 | 9/2016 | Beausoleil et al. |
| 2016/0285702 A1 | 9/2016 | Beausoleil et al. |
| 2016/0285795 A1 | 9/2016 | Beausoleil et al. |
| 2016/0285796 A1 | 9/2016 | Beausoleil et al. |
| 2016/0285797 A1 | 9/2016 | Beausoleil et al. |
| 2016/0285817 A1 | 9/2016 | Beausoleil et al. |
| 2016/0285818 A1 | 9/2016 | Beausoleil et al. |
| 2016/0285890 A1 | 9/2016 | Beausoleil et al. |
| 2016/0314473 A1 | 10/2016 | Engles et al. |
| 2016/0371395 A1 | 12/2016 | Dumant et al. |
| 2017/0006102 A1 | 1/2017 | Mody et al. |
| 2017/0046531 A1 | 2/2017 | Roberts |
| 2017/0139557 A1 | 5/2017 | Heo et al. |
| 2017/0192656 A1 | 7/2017 | Pedrick et al. |
| 2017/0220605 A1 | 8/2017 | Nivala et al. |
| 2017/0220657 A1 | 8/2017 | Nivala et al. |
| 2017/0249070 A1 | 8/2017 | Chen et al. |
| 2017/0269805 A1 | 9/2017 | DeMaris et al. |
| 2017/0285928 A1 | 10/2017 | Beausoleil et al. |
| 2017/0371891 A1 | 12/2017 | Yazganarikan |
| 2018/0143975 A1 | 5/2018 | Casal et al. |
| 2018/0189735 A1 | 7/2018 | Lo et al. |

FOREIGN PATENT DOCUMENTS

| | | |
|---|---|---|
| AU | 2016201472 B2 | 12/2016 |
| AU | 2017201395 A1 | 3/2017 |
| AU | 2016201019 B2 | 4/2017 |
| AU | 2017204625 A1 | 7/2017 |
| AU | 2016235983 82 | 10/2017 |
| AU | 2016235985 B2 | 10/2017 |
| AU | 2016236015 B2 | 10/2017 |
| AU | 2016235984 B2 | 10/2018 |
| CN | 1527226 A | 9/2004 |
| CN | 101689188 A | 3/2010 |
| CN | 102375858 A | 3/2012 |
| CN | 107431631 A | 12/2017 |
| CN | 107438840 A | 12/2017 |
| EP | 2884408 A1 | 6/2015 |
| EP | 3073674 A1 | 9/2016 |
| EP | 3251290 A1 | 12/2017 |
| EP | 3251305 A1 | 12/2017 |
| EP | 3251288 B1 | 9/2019 |
| EP | 3073673 | 7/2020 |
| EP | 3251289 | 9/2020 |
| JP | S61279916 | 12/1986 |
| JP | 2000060803 A | 2/2000 |
| JP | 2000105731 A | 4/2000 |
| JP | 2001202405 A | 7/2001 |
| JP | 2001229282 A | 8/2001 |
| JP | 2002244988 A | 8/2002 |
| JP | 2002297883 A | 10/2002 |
| JP | 2003108503 A | 4/2003 |
| JP | 2003256323 A | 9/2003 |
| JP | 2003316629 A | 11/2003 |
| JP | 2004013267 A | 1/2004 |

(56) References Cited

FOREIGN PATENT DOCUMENTS

| | | | |
|---|---|---|---|
| JP | 2004046796 | A | 2/2004 |
| JP | 2004355417 | A | 12/2004 |
| JP | 2004362118 | A | 12/2004 |
| JP | 2005346704 | A | 12/2005 |
| JP | 2006092074 | A | 4/2006 |
| JP | 2006155550 | A | 6/2006 |
| JP | 2006189958 | A | 7/2006 |
| JP | 2007072523 | A | 3/2007 |
| JP | 2007323561 | A | 12/2007 |
| JP | 2009069899 | A | 4/2009 |
| JP | 2010079889 | A | 4/2010 |
| JP | 2013161481 | A | 8/2013 |
| JP | 2013175059 | A | 9/2013 |
| JP | 2014134961 | A | 7/2014 |
| JP | 2014164717 | A | 9/2014 |
| JP | 2015032092 | A | 2/2015 |
| JP | 2015056096 | A | 3/2015 |
| JP | 2016099894 | A | 5/2016 |
| JP | 6028118 | B2 | 10/2016 |
| JP | 2016181250 | A | 10/2016 |
| JP | 2016184404 | A | 10/2016 |
| JP | 2017084356 | A | 5/2017 |
| JP | 2017182790 | A | 10/2017 |
| WO | 2007058207 | A1 | 5/2007 |
| WO | 2010102296 | A1 | 9/2010 |
| WO | 2013033144 | A2 | 3/2013 |
| WO | 2014200634 | A1 | 12/2014 |
| WO | 2015080798 | A1 | 6/2015 |
| WO | 2016085822 | A1 | 6/2016 |
| WO | 2016153676 | A1 | 9/2016 |
| WO | 2016153735 | A1 | 9/2016 |
| WO | 2016153736 | A1 | 9/2016 |
| WO | 2016153737 | A1 | 9/2016 |
| WO | 2016168748 | A1 | 10/2016 |

OTHER PUBLICATIONS

Decision to Refuse European Patent Application No. 17804403.8 dated Jul. 1, 2021, 12 pages.
Notice of Reasons for Refusal for Japanese Application No. 2020-523702 dated Jun. 25, 2020, 12 pages.
Final Office Action from U.S. Appl. No. 15/055,566, dated Oct. 13, 2021, 24 pages.
Shultz G., "Take Control or Your Windows 7 Open With Menus." Jan. 12, 2012, TechRepublic, https://www.techrepublic.com/blog/windows-and-office/take-control-of-your-windows-7-open-with-menus/, 11 pages.
Non-Final Office Action from U.S. Appl. No. 15/055,566, dated Jul. 8, 2022, 23 pages.
Communication pursuant to Article 94(3) EPC for EP Application No. 19195083.1, dated Mar. 31, 2021, 6 pages.
Notice of Acceptarsce for Australian Application No. 2018397276 dated Jun. 28, 2021, 3 pages.
Opposition—Decision Issued for Australian Application No. 2017385025, dated Jun. 30, 2021, 10 pages.
Non-Final Office Action from U.S. Appl. No. 17/220,369, dated Sep. 16, 2021, 11 pages.
Notice of Allowance from U.S. Appl. No. 15/859,028, dated Sep. 10, 2021, 12 pages.
Advisory Action from U.S. Appl. No. 15/055,566, dated Jan. 24, 2022, 3 pages.
Extended European Search Report for European Application No. 21196029.9 dated Dec. 14, 2021, 9 pages.
Chronaki C.E., et al., "WebOnCOLL: Medical Collaboration in Regional Healthcare Networks," IEEE, Dec. 1997, vol. 1 (4), 13 pages.
First Examination Report for Australian Application No. 2020277236 dated Feb. 10, 2022, 3 pages.
Notice of Allowance from U.S. Appl. No. 14/725,982, dated Mar. 7, 2022, 6 pages.
Notice of Allowance from U.S. Appl. No. 14/725,982, dated Mar. 25, 2022, 3 pages.
Notice of Allowance from U.S. Appl. No. 17/220,369, dated Mar. 25, 2022, 11 pages.
Notice of Allowance from U.S. Appl. No. 16/858,120, dated Jan. 22, 2021, 10 pages.
Notice of Allowance from U.S. Appl. No. 15/395,220, dated May 20, 2019, 7 pages.
Notice of Allowance from U.S. Appl. No. 14/725,905, dated Jan. 10, 2020, 2 pages.
Notice of Reasons for Refusal for Japanese Application No. 2018-190286 dated Feb. 26, 2021, 7 pages.
Notice of Reasons for Refusal for Japanese Application No. 2018-190286 dated Jun. 29, 2020, 8 pages.
Notice of Reasons for Refusal for Japanese Application No. 2019-508896 dated Jan. 5, 2021, 21 pages.
Notice of Reasons for Refusal for Japanese Application No. 2019-508896 dated May 8, 2020, 24 pages.
Notification of the First Office Action and Search Report for Chinese Application No. 201680013771.1 dated Dec. 4, 2019, 12 pages.
Notification of Reason(s) for Refusal for Japanese Application No. 2019-508895 dated Aug. 21, 2020, 7 pages.
Office Action for Australian Application No. 2016235984 dated Mar. 22, 2018, 3 pages.
Office Action for Japanese Application No. 2017-544960 dated Mar. 16, 2018, 10 pages. (English Translation only).
Office Action for U.S. Appl. No. 14/725,942 dated Feb. 5, 2020, 25 pages.
Office Action for U.S. Appl. No. 15/476,742 dated Feb. 5, 2020, 23 pages.
Pundir A K.,"Towards a complexity framework for managing projects," Dec. 31, 2007, 7 pages.
Shimada H., "Online Storage Service having Documents—Editing Functions: Introduction to Google Drive for a Person that Missed the Wave," ITmedia Inc., Feb. 7, 2014, retrieved from Internet URL: https://web.archive.org/web/20140207083317/ and http://www.atmarkit.co.jp/ait/articles/1303/13/news1 05.html on May 27, 2016, 21 pages.
Summons to attend oral proceedings pursuant to Rule 115(1) EPC for European Application No. 17805064.7 mailed on Apr. 21, 2020, 9 pages.
Technology for Teachers and Students, "Microsoft OneDrive and SkyDrive Tutorial," retrieved from https://www.youtube.com/watch?v=RZoYvmi9L9E, Feb. 2, 2014, 1 page.
Voida S., et al., "Share and Share Alike: Exploring the User Interface Affordances of File Sharing," Proceedings of the ACM Conference on Human Factors in Computing Systems (CHI 2006), Apr. 22-27, 2006, ACM, 10 pages.
White C., "5 Unusual Ways to Use Dropbox You Might Not Have Thought Of," Dec. 18, 2010, retrieved from http://mashable.com/2010/12/18/dropbox-uses/ on Sep. 15, 2017, 3 pages.
Wikihow, "How to Use Facebook," 2013, retrieved from http://www.wikihow.com/Use-Facebook on Sep. 15, 2017, 8 pages.
Wikihow, "How to Use Facebook(with cheat sheet)", 2013, retrieved from http://www.wikihow.com/Use-Facebook on Mar. 28, 2019, 7 pages.
Yoshida H., "Word 2007 & Excel 2007 Masterbook," Japan, Daily Communication, May 30, 2009, first edition, 3 pages.
Advisory Action from U.S. Appl. No. 15/055,566, dated Nov. 23, 2020, 4 pages.
Advisory Action from U.S. Appl. No. 14/725,982, dated Apr. 23, 2020, 5 pages.
Advisory Action from U.S. Appl. No. 15/624,615, dated Aug. 28, 2019, 2 pages.
Advisory Action from U.S. Appl. No. 15/859,028, dated Feb. 3, 2021, 4 pages.
Advisory Action from U.S. Appl. No. 15/859,028, dated Jun. 25, 2020, 3 pages.
Anzures-Garcia M., et al., "Service-Based Layered Architectural Model for Building Collaborative Applications in Heterogeneous Environments", IEEE, 2009, 12 pages.

(56) References Cited

OTHER PUBLICATIONS

Bachpalle S.D., et al., "Data Security Approach for Online Social Network", IEEE, Jul. 8, 2014, 6 pages.
Beliz System, "Making Documents on Google Drive," Digital Documents Laboratories, Jul. 18, 2014, Retrieved from: https://watasu.com/dedoken/cloud/page2.html, 9 pages.
Board Opinion for Chinese Application No. 201680013779.8 dated Aug. 19, 2020, 10 pages.
Brady T., et al., "Creating Value by Delivering Integrated Solutions," 2005, International Journal of Project Management, pp. 360-365.
Communication pursuant to Article 94(3) EPC for European Application No. 16720200.1 dated Sep. 30, 2019, 5 pages.
Communication Pursuant to Rules 161(1) and 162 EPC for European Application No. 17804403.8 dated Aug. 6, 2019, 3 pages.
Communication under Rule 71(3) EPC for European Application No. 16711411.5 dated Oct. 18, 2019, 7 pages.
Communication Pursuant to Article 94(3) EPC for European Application No. 17804403.8 dated May 7, 2020, 7 pages.
Communication Pursuant to Article 94(3) EPC for European Application No. 17805064.7 dated Nov. 5, 2019, 4 pages.
Communication Pursuant to Article 94(3) for EP Application No. 19182606.4 dated Mar. 16, 2021, 7 pages.
Communication under Rule 71(3) EPC for European Application No. 16711412.3 dated Nov. 13, 2019, 7 pages.
Communication under Rule 71(3) EPC for European Application No. 16161853.3 dated Feb. 4, 2020, 7 pages.
Communication under rule 71 (3) EPC Intention to Grant for European Application No. 16711412.3 dated Mar. 27, 2020, 7 pages.
Communication under Rule 71(3) EPC of Intention to Grant for European Application No. 16720200.1 dated Jun. 12, 2020, 136 pages.
Communication under Rule 71(3) EPC of Intention to Grant for European Application No. 16720200.1 dated Sep. 4, 2020, 70 pages.
Corrected Notice of Allowability for U.S. Appl. No. 15/624,615 dated Feb. 6, 2020, 2 pages.
Crucial Works, Inc., "Sharing Folders", Apps x Support, Jan. 29, 2013, Retrieved from: https://web.archive.org/web/20130129101828/http://www.appsupport.jp/drive/share-folder on Aug. 29, 2017, 8 pages.
Decision to refuse European Patent Application No. 17805064.7 dated Feb. 12, 2021, 32 pages.
Examination Report No. 1, for Australian Application No. 2017385025, dated Nov. 28, 2019, 5 pages.
Examination Report No. 1, for Australian Application No. 2017385026, dated Nov. 28, 2019, 6 pages.
Examination Report No. 1, for Australian Application No. 2018397276, dated Sep. 9, 2020, 4 pages.
Examination Report No. 2, for Australian Application No. 2017385025, dated Apr. 30, 2020, 5 pages.
Examination Report No. 2, for Australian Application No. 2017385026, dated Apr. 30, 2020, 5 pages.
Examination Report. No. 2, for Australian Application No. 2018397276, dated Jan. 7, 2021, 4 pages.
Examination Report No. 3, for Australian Application No. 2017385025, dated Aug. 4, 2020, 5 pages.
Examination Report No. 3, for Australian Application No. 2017385026, dated Aug. 4, 2020, 6 pages.
Examination Report No. 4, for Australian Application No. 2017385025, dated Nov. 2, 2020, 4 pages.
Examination Report No. 4, for Australian Application No. 2017385026, dated Nov. 20, 2020, 5 pages.
Extended european Search Report for Application No. 19195083.1 dated Oct. 31, 2019, 8 pages.
Extended European Search Report for EP Application No. 16161853.3 dated Aug. 18, 2016, 3 pages.
Extended European Search Report for EP Application No. 16161962.2 dated Aug. 24, 2016, 3 pages.

Extended European Search Report for EP Application No. 19182606.4 dated Aug. 8, 2019, 9 pages.
Extended European Search Report for European Application No. 20167778.8 dated Jul. 7, 2020, 10 pages.
Final Office Action for U.S. Appl. No. 14/725,958 dated Feb. 5, 2020, 26 pages.
Final Office Action from U.S, U.S. Appl. No. 14/725,982, dated Feb. 19, 2020, 16 pages.
Final Office Action from U.S. Appl. No. 15/055,566, dated Sep. 29, 2020, 27 pages.
Final Office Action from U.S. Appl. No. 15/476,688, dated Apr. 16, 2020, 25 pages.
Final Office Action from U.S. Appl. No. 15/476,755, dated Apr. 16, 2020, 29 pages.
Final Office Action from U.S. Appl. No. 15/859,028, dated Apr. 15, 2020, 21 pages.
-inal Office Action from U.S. Appl. No. 15/859,028, dated Nov. 27, 2020, 24 pages.
Freedman V., et al., "A Collaborative Extensible User Environment for Simulation and Knowledge Management," IEEE, 2015, pp. 280-286.
Google, Inc., "View and create documents on Android," Mar. 19, 2015, Wayback Machine, Google Docs, downloaded from https://web.archive.org/web/20150319022434/https://support.google.com/docs/answer/3420399?hl=en, May 30, 2016, 3 pages.
Hoomey, Estyle Inc., "Google Drive How to Use Leverage Surgery "spreadsheet." that can be used in Excel instead!," Nov. 9, 2013, retrieved from https://web.archive.org/web/20131109104805/http://1hoomey.net/googledrive-study-4 on Jun. 30, 2016, 18 pages.
Hoomey, Estyle Inc., "How to Use Google Drive's 'Spread Sheet' that is Usable instead of Excel," Nov. 9, 2013, retrieved from https://web.archieve.org/web/20131109104805/http://hoomey.net/googledrive-study-4, on Sep. 15, 2017, 9 pages.
Non-Final Office Action from U.S. Appl. No. 16/911,926, dated Nov. 29, 2021, 16 pages.
International Preliminary Report on Patentability for PCT Application No. PCT/US16/19052, dated Oct. 5, 2017, 7 pages.
International Preliminary Report on Patentability for PCT Application No. PCT/US16/20117, dated Oct. 5, 2017, 8 pages.
International Preliminary Report on Patentability for PCT Application No. PCT/US16/20124, dated Oct. 5, 2017, 8 pages.
International Preliminary Report on Patentability for PCT Application No. PCT/US16/20132, dated Oct. 5, 2017, 8 pages.
International Search Report & Written Opinion for Application No. PCT/US2018/04780 dated Oct. 15, 2018, 16 pages.
International Search Report and Written Opinion for PCT Application No. PCT/US16/19052, dated Nov. 7, 2016, 9 pages.
International Search Report and Written Opinion for PCT Application No. PCT/US16/20117, dated May 13, 2016, 10 pages.
International Search Report and Written Opinion for PCT Application No. PCT/US16/20124, dated May 24, 2016, 10 pages.
International Search Report and Written Opinion for PCT Application No. PCT/US16/20132, dated May 24, 2016, 9 pages.
International Search Report and Written Opinion for PCT Application No. PCT/US2017/061204 dated Dec. 21, 2017, 9 pages.
International Search Report and Written Opinion for PCT Application No. PCT/US2017/061206 dated Jan. 3, 2018, 11 pages.
"Intralinks VIA," 2015, Retrieved from https://www/intralinks.com/sites/default/files/file_attach/intralinks_via_brochure.pdf, 13 pages.
Iwashi, "How to use Google Documents," Wind-mill Iwashi Blog, Dec. 17, 2014, retrieved from http://wind-mill.co.jp/iwashiblog/2014/12/google-document/, Mar. 27, 2019, 12 pages.
Kaizu T., "Customize Explorer's New Menu on Window," Tech Tips, published on Apr. 4, 2003, 14 pages.
Kappes G., et al., "Virtualization-Aware Access Control for Multitenant Filesystems," MSST, Jun. 2-6, 2014, pp. 1-6.
Mislove A., et al., "POST: A secure, resilient, cooperative messaging system," Conference: Proceedings of HotOS'03: 9th Workshop on Hot Topics in Operating Systems, Lihue (Kauai), Hawaii, USA, May 18-21, 2003, 6 pages.
Non-Final Office Action from U.S. Appl. No. 14/725,942, dated Sep. 27, 2019, 26 pages.

(56) References Cited

OTHER PUBLICATIONS

Non-Final Office Action from U.S. Appl. No. 14/725,958, dated Sep. 27, 2019, 25 pages.
Non-Final Office Action from U.S. Appl. No. 14/725,982, dated Sep. 20, 2019, 13 pages.
Non-Final Office Action from U.S. Appl. No. 15/055,566, dated Mar. 5, 2020, 25 pages.
Non-Final Office Action from U.S. Appl. No. 15/055,566, dated Mar. 31, 2021, 32 pages.
Non-Final Office Action from U.S. Appl. No. 15/476,688, dated Nov. 18, 2019, 23 pages.
Non-Final Office Action from U.S. Appl. No. 15/476,715, dated Oct. 4, 2019, 25 pages.
Non-Final Office Action from U.S. Appl. No. 15/476,755, dated Nov. 29, 2019, 23 pages.
Non-Final Office Action from U.S. Appl. No. 15/624,615, dated Oct. 2, 2019, 12 pages.
Non-Final Office Action from U.S. Appl. No. 15/859,028, dated Jan. 3, 2020, 20 pages.
Non-Final Office Action from U.S. Appl. No. 15/859,028, dated Jul. 30, 2020, 23 pages.
Non-Final Office Action from U.S. Appl. No. 16/525,811, dated Aug. 20, 2020, 7 pages.
Non-Final Office Action from U.S. Appl. No. 16/858,120, dated Oct. 6, 2020, 8 pages.
Notice of Reasons for Refusal for Japanese Application No. 2018-190286 dated Oct. 4, 2019, 5 pages.
Notice of Allowance from U.S. Appl. No. 14/725,905, dated Oct. 2, 2019, 15 pages.
Notice of Allowance from U.S. Appl. No. 14/725,942, dated Mar. 10, 2021, 6 pages.
Notice of Allowance from U.S. Appl. No. 14/725,942, dated Sep. 16, 2020, 5 pages.
Notice of Allowance from U.S. Appl. No. 14/725,958, dated Mar. 10, 2021, 6 pages.
Notice of Allowance from U.S. Appl. No. 14/725,958, dated Sep. 17, 2020, 12 pages,.
Notice of Allowance from U.S. Appl. No. 14/726,103, dated Sep. 16, 2019, 2 pages.
Notice of Allowance from U.S. Appl. No. 15/476,688, dated Apr. 30, 2020, 9 pages.
Notice of Allowance from U.S. Appl. No. 15/476,715, dated Aug. 6, 2020, 9 pages.
Notice of Allowance from U.S. Appl. No. 15/476,715, dated May 13, 2020, 9 pages.
Notice of Allowance from U.S. Appl. No. 15/476,742, dated Aug. 21, 2020, 9 pages.
Notice of Allowance from U.S. Appl. No. 15/476,742, dated Feb. 8, 2021, 10 pages.
Notice of Allowance from U.S. Appl. No. 15/476,742, dated Jul. 1, 2020, 9 pages.
Notice of Allowance from U.S. Appl. No. 15/476,742, dated Mar. 3, 2021, 3 pages.
Notice of Allowance from U.S. Appl. No. 15/476,755, dated Feb. 10, 2021,9 pages.
Notice of Allowance from U.S. Appl. No. 15/476,755, dated Mar. 8, 2021, 3 pages.
Notice of Allowance from U.S. Appl. No. 15/476,755, dated May 20, 2020, 9 pages.
Notice of Allowance from U.S. Appl. No. 15/476,755, dated Sep. 3, 2020, 9 pages.
Notice of Allowance from U.S. Appl. No. 15/624,615, dated Dec. 30, 2019, 9 pages.
Notice of Allowance from U.S. Appl. No. 15/859,028, dated Apr. 6, 2021, 11 pages.
Notice of Allowance from U.S. Appl. No. 16/525,811, dated Feb. 26, 2021, 10 pages.
Extended European Search Report for European Application No. 21160648.8 dated Jun. 17, 2021, 12 pages.
Final Office Action from U.S. Appl. No. 16/911,926, dated Jun. 14, 2022, 16 pages.
Froese T., "The impact of emerging information technology on project management for construction," Automation in Construction, 2010, vol. 19(5), pp. 531-538.
Communication Pursuant to Article 94(3) EPC for European Application No. 18766090.7 dated Aug. 30, 2021, 7 pages.
Brief Communication of Oral Proceedings for European application No. 17804403.8, dated May 11, 2021, 10 pages.
Communication Pursuant to Article 94(3) EPC for European Application No. 19195083.1 dated Jun. 7, 2022, 4 pages.
Communication under Rule 71 (3) EPC of intention to grant for European Application No. 20167778.8 dated Dec. 19, 2022, 79 pages.
Non-Final Office Action from U.S. Appl. No. 16/911,926, dated Dec. 21, 2022, 16 pages.
Non-Final Office Action from U.S. Appl. No. 17/805,361, dated Nov. 18, 2022, 14 pages.
Notice of Allowance from U.S. Appl. No. 15/055,566, dated Nov. 18, 2022, 17 pages.
Intention to Grant for European Application No. 19182606.4 dated Dec. 6, 2022, 77 pages.
Summons to Attend Oral Proceedings Pursuant to Rule 115(1) EPC for European Application No. 18766090.7, mailed Dec. 22, 2022, 11 pages.
Non-Final Office Action from U.S. Appl. No. 17/360,738, dated Jun. 9, 2023, 17 pages.
Result of Consultation for European Application No. 18766090.7, dated Apr. 28, 2023, 15 pages.
Notice of Allowance from U.S. Appl. No. 17/805,361, dated May 24, 2023, 12 pages.
Wang F., et al., "Web-based Collaborative Information Integration for Scientific Research," IEEE 23rd International Conference on Data Engineering, 2007, pp. 1232-1241.
Non-Final Office Action from U.S. Appl. No. 18/188,257, dated Sep. 14, 2023, 6 pages.
Notice of Reasons for Refusal for Japanese Application No. 2022-118838 dated Sep. 25, 2023, 8 pages.

* cited by examiner

301

Recents
Personal
My Company, Inc.

Your Tasks
All Projects
Project Widget
Project Awesome
Project Opie

Your Tasks > All Projects  1420

☰ ☐  New Task  (PB)

Project Widget
☐ Phil Bowman is it possible from the #engineering side to include a video as the background?
☐ Design UI background

Project Awesome
☐ Design awesome UI
☐ Build more awesomeness into UI
⤺ 1460

Project Opie
☐ Go fishing with Andy ⤺ 1462
☐ Get haircut from Floyd ⤺ 1602

MANAGING PROJECTS IN A CONTENT MANAGEMENT SYSTEM

CROSS-REFERENCE TO RELATED APPLICATIONS

This is a continuation of U.S. application Ser. No. 16/525,811, filed Jul. 30, 2019, which is a continuation of U.S. application Ser. No. 15/395,220, filed Dec. 30, 2016, now U.S. Pat. No. 10,402,786, issued Sep. 3, 2019, which are incorporated by reference in their entireties.

BACKGROUND

There are many software applications that assist users in managing projects. Often these software applications are complicated and difficult to use. Many times several different software applications are required to manage the various tasks, documents types, schedules, communications, and other project related activities and files. Using these existing systems to manage a project can be difficult to learn, burdensome to use, and time consuming for the user.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for managing projects in a content management system. For example, the content management system can create a project folder (e.g., shared folder) for managing data associated with a project. The project folder can be shared with content management system users (e.g., project members) who are contributors to the project. The content management system can store project data (e.g., content items, communications, comments, tasks, etc.) related to the project in the project folder. When the project folder is selected by a user, the content management system can generate a project folder view that presents the project data associated with the project folder and/or project in a convenient and easy to access graphical user interface. The content management system can aggregate project data from various content items associated with the project and present the project data in a single graphical user interface.

Disclosed are systems, methods, and non-transitory computer-readable storage media for managing tasks in a content management system. For example, the content management system can collect, aggregate, and/or store task data assigned to a user from across projects and/or content items. The user can select to view tasks for a particular project and/or from across all projects. The content management system can generate a single graphical user interface for presenting the task data associated with the user. The content management system can generate a graphical user interface the allows the user to move tasks from one task status graphical element (e.g., task status container) to another task status graphical element to change the status of a task associated with the user. Thus, the user can quickly and easily view the tasks assigned to the user and update the status of tasks in an easy to use graphical user interface.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 16 illustrates an example graphical user interface presenting a newly created task;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for an easy, simple, and convenient way for users to manage project data. By organizing project data into a shared project folder managed by the content management system described herein, users are able to access all project data for a specific project at a single location. Moreover, the content management system can generate and present project data by generating a graphical user interface that aggregates project data from across content items stored in the shared folder and/or associated with the project so that the user does not have to run multiple software applications or interact with multiple user interfaces to view the project data. Additionally, since the content management system synchronizes the project folder with the computing devices associated with members/users of the project, project members can access project data through the content management system's servers or on the local file system of the users' devices (e.g., when the user's device is not connected to the network). The technology disclosed herein improves the efficiency of both user device and content management system server devices by reducing the number of software applications a user previously had to install on the user's device to perform project management tasks. Moreover, by storing all project data in a centralized location (e.g., instead of at different locations), the user device and/or the content management system servers are required to do less processing to find, aggregate, process, and present data (e.g., content items, comments, tasks, etc.) associated with a project.

Figure 1:
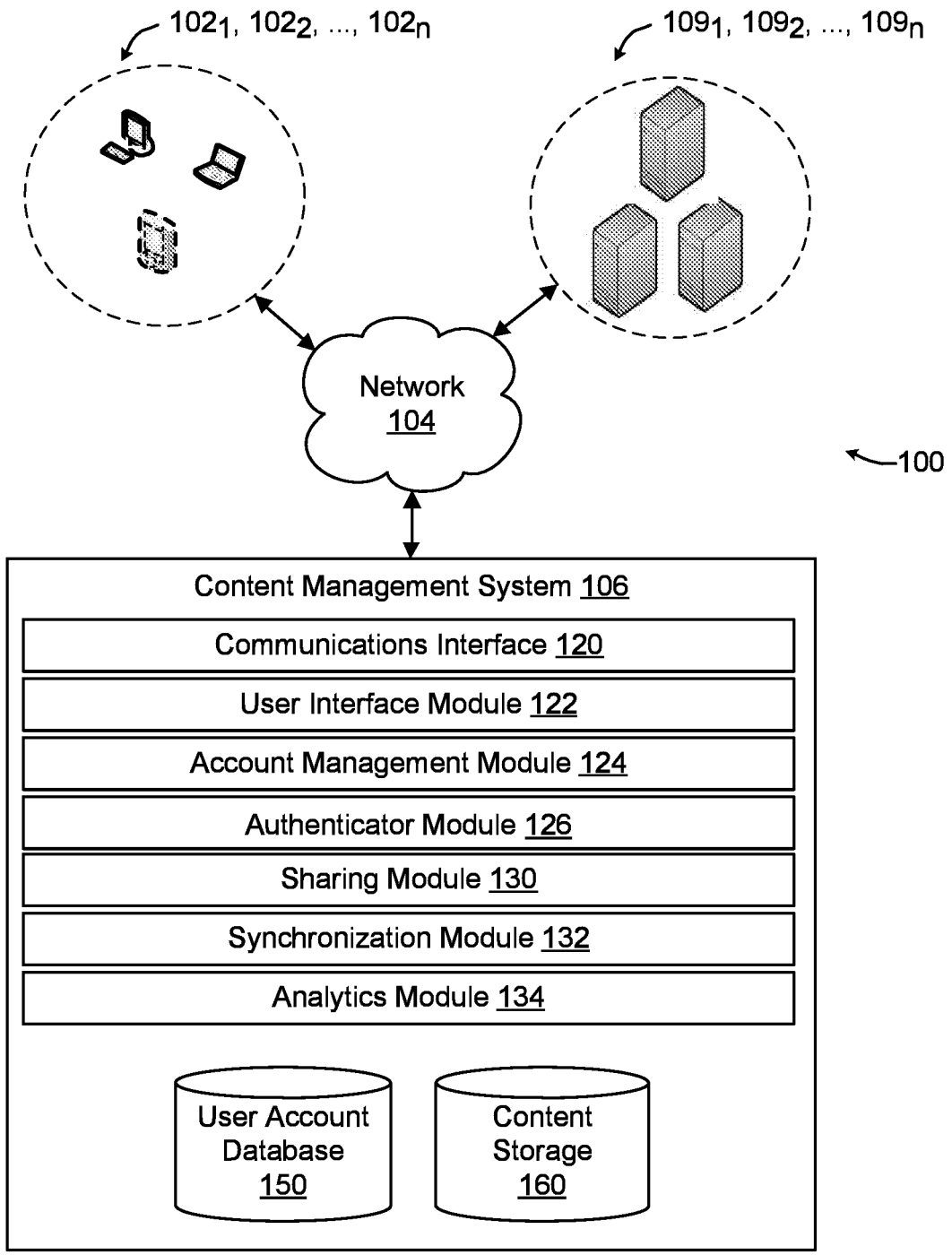
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2$, ..., $102_n$ (collectively "102") connected to network 104 by direct and/or indirect communication. Content management system 106 can include a single computing device (e.g., a server) or multiple computing devices (e.g., multiple servers) that are configured to perform the functions and/or operations necessary to provide the services described herein. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content items, as well as perform a variety of content management tasks, such as retrieve, modify, browse, and/or share the content items. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content items, such as digital data, documents, text files, audio files, video files, etc., from one or more client devices 102 authorized on the account. The content items can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device 102$_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items from one or more client devices 102. The synchronization can be platform agnostic. That is, the content items can be synchronized across multiple client devices 102 of varying type, capabilities, operating systems, etc. For example, client device 102$_i$ can include client software, which synchronizes, via a synchronization module 132 at content management system 106, content in client device 102$_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content items that have been updated at content management system 106 and synchronize those changes to the local collection. The client software can provide notifications of synchronization operations, and can provide indications of content statuses directly within the content management application. Sometimes client device 102$_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers 109$_1$, 109$_2$, ..., 109$_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

Figure 2:
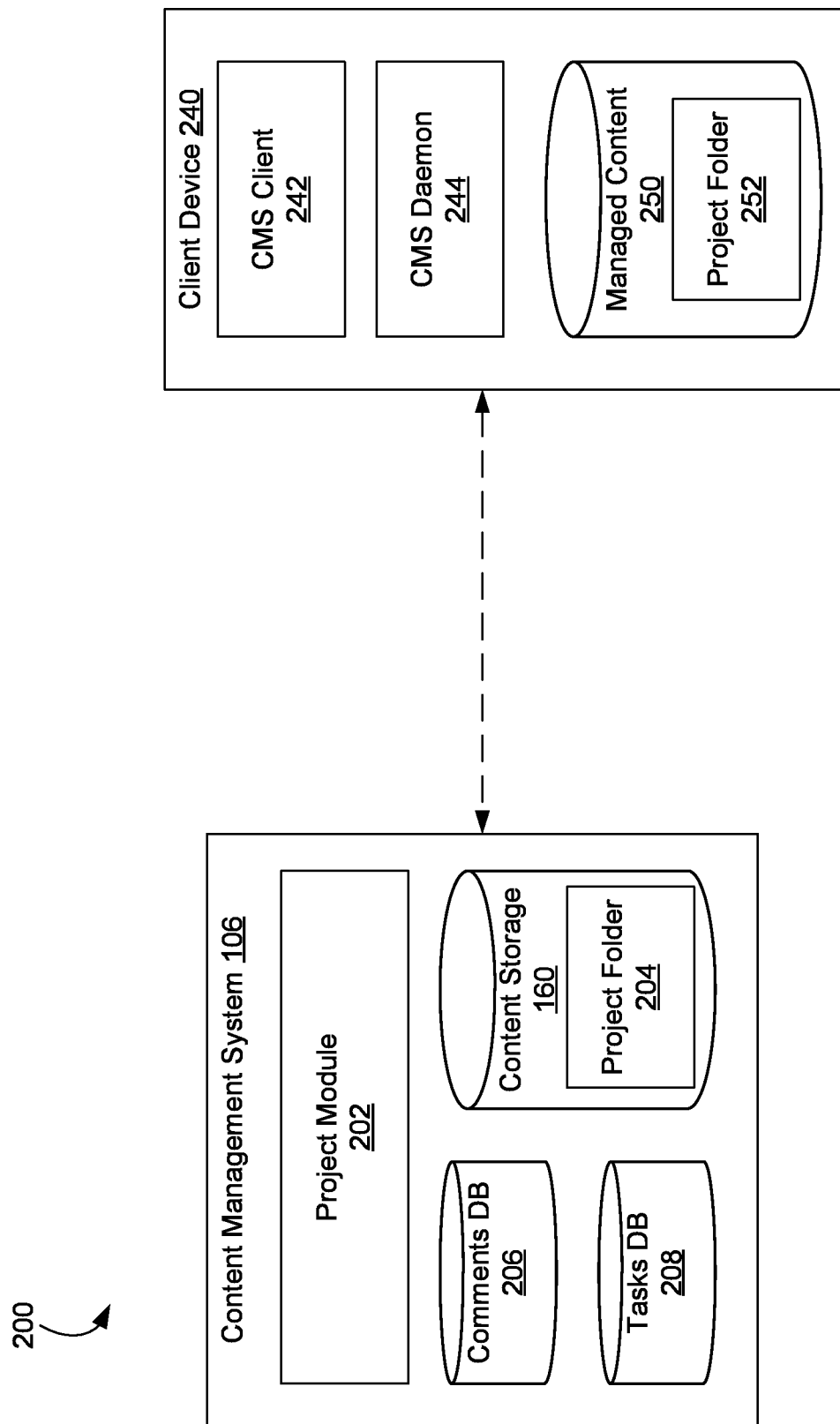
FIG. 2 is a block diagram of an example system for managing project data in a content management system.

FIG. 2 is a block diagram of an example system 200 for managing project data in a content management system. For example, system 200 can correspond to system 100 of FIG. 1, described above. As described above, system 200 can include content management system 106.

In some implementations, content management system 106 can include project module 202. For example, project module 202 can be a software module installed and/or running on content management system 106. Project module 202 can manage project folders and project data associated with projects. Project module 202 can generate a project folder view (e.g., graphical user interface) for presenting project data to a user (e.g., project member). Project module 202 can, for example, store content items and/or project data associated with a project in project folder 204 in content storage 160.

In some implementations, content management system 106 can include comments database 206. For example, comments database 206 can be stored in project folder 204 or stored separately from projects folder 204. Comments database 206 can store comments associated with a particular project or many different projects. For example, project module 202 can read content items, including content item metadata, stored in project folder 204 and extract comments (e.g., messages from one user to another user) from the content items. Project module can determine various attributes (e.g., project identifier, author identifier, recipient identifier, tags, source content item identifier, etc.) for each comment. Project module 202 can then store the comments in association with the determined attributes in comments database 206 so that project module 202 can later locate comments based on the comment attributes.

In some implementations, project module 202 can analyze a comment to determine attributes for the comment. For example, project module 202 can determine a source content item attribute based on the content item identifier corresponding to the content item in which the comment was found. Similarly, project module 202 can determine a project identifier attribute for a comment based on the project folder where the corresponding content item is stored. For example, when a user adds a comment to a content item stored in project folder 204 corresponding to "Project Widget", then project module 202 can determine the project attribute for the comment to be "Project Widget".

Project module 202 can determine an author identifier for the comment based on the user identifier associated with the user who wrote the comment. For example, each user of content management system 106 can be assigned a user identifier. When a user edits a content item managed by content management system 106, content management system 106 can store metadata for the content item that identifies the user who made the changes to the content item and what changes (e.g., edits, comments, etc.) were made to the content item. Thus, project module 202 can determine the author identifier attribute based on the user identifier stored in the content item metadata.

In some implementations, project module can determine comment attributes based on special expressions included in a comment. For example, project module 202 can analyze the comments to determine whether a comment includes expressions (e.g., prefixes, tags, symbols, etc.) that indicate attributes for the comment. For example, content management system 106 can define a user identifier prefix (e.g., the "at" symbol "@") that when added to a comment indicates a recipient identifier attribute will follow. For example, a user can input a comment that includes "@kevin" to address the comment to a project member named Kevin. Thus, when project module 202 analyzes a comment and finds the string "@kevin", project module 202 can determine that the recipient attribute for the comment includes the user "Kevin."

Similarly, content management system 106 can define a content item prefix (e.g., the plus "+" character) that when added to a comment indicates a content item identifier attribute will follow. For example, a user can input a comment that includes "+overview.pdf" to create a link to a content item in the comment. When project module 202 analyzes a comment and finds the string "+overview.pdf", project module 202 can determine that a linked content item attribute for the comment includes the content item "overview.pdf." Project module 202 can, for example, convert a content item identifier prefixed with the content item prefix into a link so that a user can access the content item through the link embedded in the comment.

In some implementations, content management system 106 can define a tag prefix (e.g., the hash "#" character) that when added to a comment indicates a tag attribute will follow. For example, a user can input a comment that includes "#engineering" to tag the comment with a subject, classification, or some other information. When project module 202 analyzes a comment and finds the string "#engineering", project module 202 can determine that a tag attribute for the comment includes the tag "engineering." Project module 202 can, for example, use tags to organize comments, tasks, or other project data, as described below.

In some implementations, content management system 106 can define a task prefix (e.g., opening and closing square brackets "[]") that when added to the beginning of a comment indicates that the comment should be converted into a task. For example, a user can input a comment that includes "[]" at the beginning of the comment to indicate that the comment should be converted into a task. When project module 202 analyzes a comment and finds the string "[]" followed by a comment and/or comment attributes, project module 202 can convert the comment into a task. Project module 202 can treat the comment attributes as task attributes and store the task and task attributes in task database 208 in addition to or instead of storing the comment that generated the task in comments database 206. For example, task database 208 can be stored in projects folder 204 or stored separately from project folder 204.

In some implementations, project module 202 can generate various project folder views based on the comments, tasks, and/or attributes stored in comments database 206 and/or tasks database 208. For example, project module 202 can generate the graphical user interfaces described below by filtering, sorting, aggregating, and/or otherwise organizing the comments and/or tasks in comments database 206 and/or tasks database 208 based on the comment attributes and/or task attributes, as described in detail below.

In some implementations, system 200 can include client device 240. For example, client device 240 can correspond to client device $102_i$ described above. Client device 240 can, for example, be a laptop computer, tablet computer, smart phone, wearable device, and/or any other computing device. Although FIG. 2 illustrates a system 200 having only one client device 240 (e.g., client device $102_i$), system 200 can include many client devices 240 (e.g., client devices $102_i$-$102_n$) that interact with content management system 106 and/or project module 202 to manage projects. For example, each member of a project may have a different client device 240 that communicates with content management system 106 to access project data managed by content management system 106 and/or project module 202.

In some implementations, client device 240 can include content management system (CMS) client 242. For example, CMS client 242 can be a native application of client device 240. For example, a native software application can be an application that is built specifically for the hardware and/or software configuration of client device 240. Thus, the graphical user interfaces (and other functionality) of CMS client 242 described below can be implemented using instructions, application programming interfaces (APIs), and other technologies native to client device 240. To generate the various graphical user interfaces below and/or implement various features described herein, CMS client 242 can request project data (e.g., project content items, project member identifiers, comments, tasks, etc.) from project module 202 over a network connection (e.g., through network 104). Project module 202 can obtain project data from project folder 204, comments database 206, and/or tasks database 208 and send the project data to CMS client 242. CMS client 242 can then present the project data on various graphical user interfaces generated by CMS client 242.

Alternatively, CMS client 242 can be a web client executed by a web browser running on client device 240. Thus, the graphical user interfaces (and other functionality) of CMS client 240 can be implemented using instructions, APIs, and other technologies that are not native to client device 240. For example, CMS client 240 can be built as a web application using non-native web code or instructions. CMS client 240 can be served to a web browser on client device 240 and the web browser can execute CMS client 240 to present the graphical user interfaces (and other functionality) to the user, as described in detail below. To generate the various graphical user interfaces below and/or implement various features described herein, CMS client 242 (e.g., the web browser) can request various project folder views (e.g., graphical user interfaces, web pages, etc.) from project module 202. Project module 202 can generate the project folder views (e.g., the graphical user interfaces described below) for presenting project data (e.g., project content items, project member identifiers, comments, tasks, etc.) and send the project views to CMS client 242 over a network connection (e.g., through network 104). For example, project module 202 can obtain project data from project folder 204, comments database 206, and/or tasks database 208, generate the project folder views based on the project data, and send the project folder views to CMS client 242. CMS client 242 can then present the project folder views on a display of client device 240.

In some implementations, client device 240 can include CMS daemon 244. For example, CMS daemon 244 can be a client of content management system 106 that maintains synchronization of data between content management system 106 and client device 240. For example, client device 240 can include managed content 250. Managed content 250 can be a portion of the file system on client device 240 managed by content management system 106 and/or CMS daemon 244. CMS daemon 244 and/or content management system 106 can synchronize content items stored in managed content 250 with content items stored in content storage 160. In particular, when the user of client device 240 is a member of a project corresponding to project folder 204, CMS daemon 244 and/or content management system 106 can synchronize project folder 204 and project folder 252 so that project folder 204 and project folder 252 include the same project content items and/or project data (e.g., comments, tasks, etc.). Thus, a user of client device 240 can access project data stored in project folder 204/252 through CMS client 242 or through the local file system (e.g., project folder 252) on client device 240.

Figure 3:
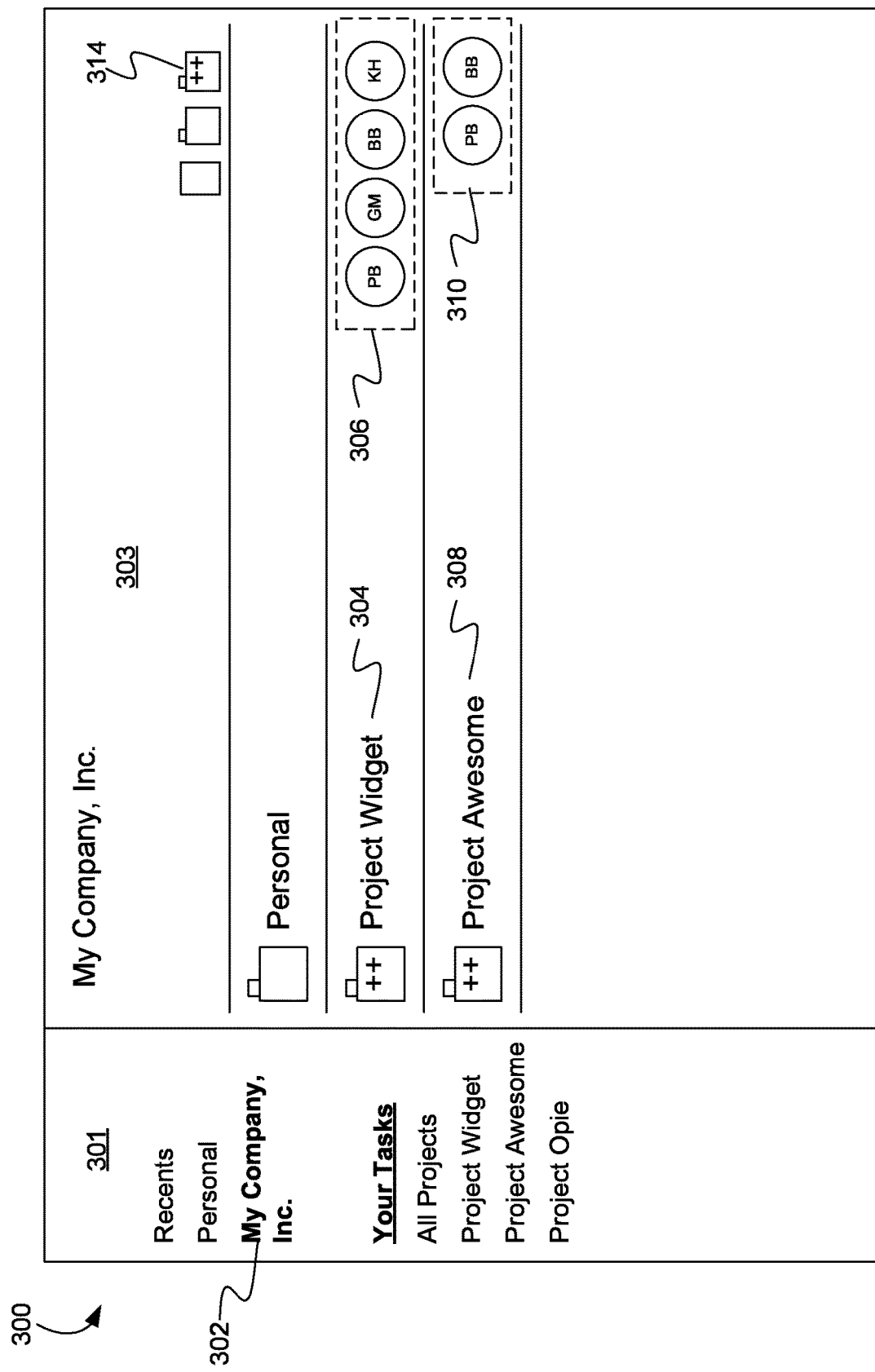
FIG. 3 illustrates an example graphical user interface for presenting project folders.

FIG. 3 illustrates an example graphical user interface 300 for presenting project folders. For example, CMS client 242 can present graphical user interface (GUI) 300 on a display of client device 240. In some implementations, GUI 300 can include side panel 301 presenting various graphical elements for viewing content management system data associated with a content management system user. While side panel 301 is not represented in each figure described below, side panel 301 can be presented along with each graphical user interface described herein. In the example illustrated by FIG. 3, the user has selected graphical element 302 to view content associated with a company that the user works for and/or for which a business account has been established in content management system 106. Upon receiving the selection of graphical element 302, CMS client 242 can present company folder view 303. In other examples, the user can select other graphical elements to view non-business (e.g., personal) folders and/or non-business project folders.

In some implementations, folder view 303 can include project folders. For example, folder view 303 can present project folder 304 and/or project folder 308. A user can cause content management system 106 to create a new project folder (e.g., project folder 304) by selecting graphical element 314. Project folders 304 and/or 308 can be shared folders accessible by other users of content management system 106. For example, most projects include a team of people that perform various tasks to accomplish the goals of the project. Thus, project folders 304 and/or 308 can be shared with other users (e.g., project members) of content management system 106. The members of each project can be represented in areas 306 and/or 310 by graphical elements (e.g., images, initials, avatars, etc.). These project members can access project folders 304 and/or 308 respectively to view project content items and other project data for the projects corresponding to project folders 304 and/or 308. A user can select a project folder to view details about the corresponding project. For example, the user can select project folder 304 (e.g., select a project) to cause CMS client 242 to present GUI 400 of FIG. 4.

Figure 4:
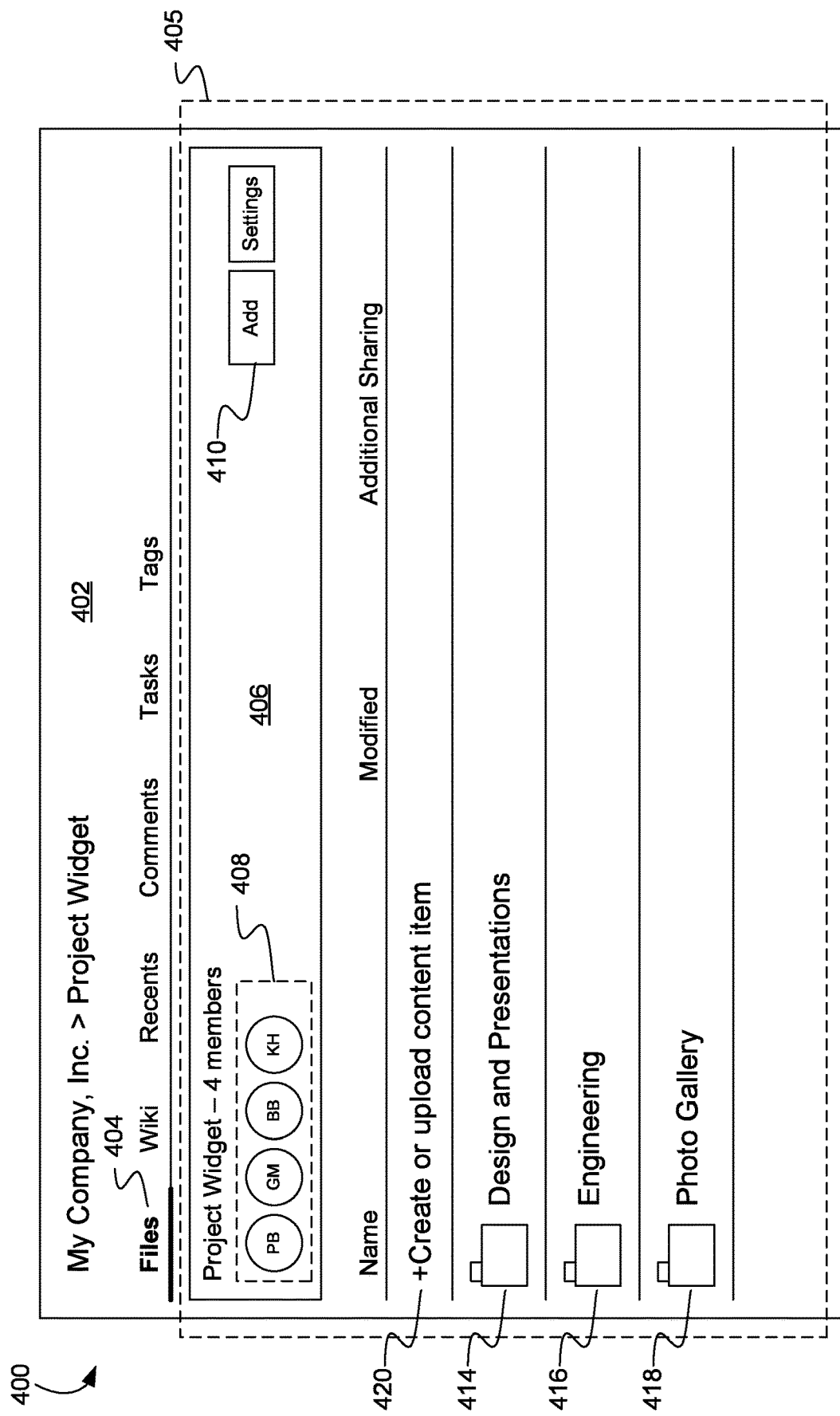
FIG. 4 illustrates an example graphical user interface for presenting a project folder view.

FIG. 4 illustrates an example graphical user interface 400 for presenting a project folder view. For example, CMS client 242 can present GUI 400 on a display of client device 240 in response to the user selecting project folder 304. GUI 400 can present project folder view 402 that presents various content items, comments, tasks, tags and/or other project data. For example, a user can select graphical element 404 to cause CMS client 242 to present project data view 405 that includes content items and/or folders associated with the selected project (e.g., "Project Widget") in project folder view 402. For example, CMS client 242 can obtain the content item information and/or project information presented in project data view 405 from project folder 204 through project module 202 or locally from project folder 252, as described above.

In some implementations, project data view 405 can include project configuration panel 406. For example, project configuration panel 406 can include graphical representations 408 of project members. Graphical representations 408 can include photographs of members' faces, initials, avatars, and/or some other visual representation that users can recognize to identify members of the selected project. In some implementations, project configuration panel 406 can include graphical element 410 for adding new members to the project. For example, a user (e.g., project manager) can select graphical element 410 to cause CMS client 242 to present graphical user interfaces for selecting and/or adding content management system users to the selected project.

In some implementations, project data view 405 can include representations of folders within project folder 304. For example, project data view 405 can include graphical elements 414, 416 and/or 418 representing various sub-folders of project folder 304. A user can select a sub-folder (e.g., graphical element 414) to view content items stored in the selected sub-folder.

In some implementations, project data view 405 can include graphical element 420 for adding new content items to the project (e.g., project folder). In the description herein, the terms "project" and "project folder" can be used interchangeably since the project folder is a representation of a corresponding project and is used to contain, manage, and/or organize project data. For example, a user can select graphical element 420 to cause CMS client 242 to present GUI 500 of FIG. 5 for adding a new content item to the project.

Figure 5:
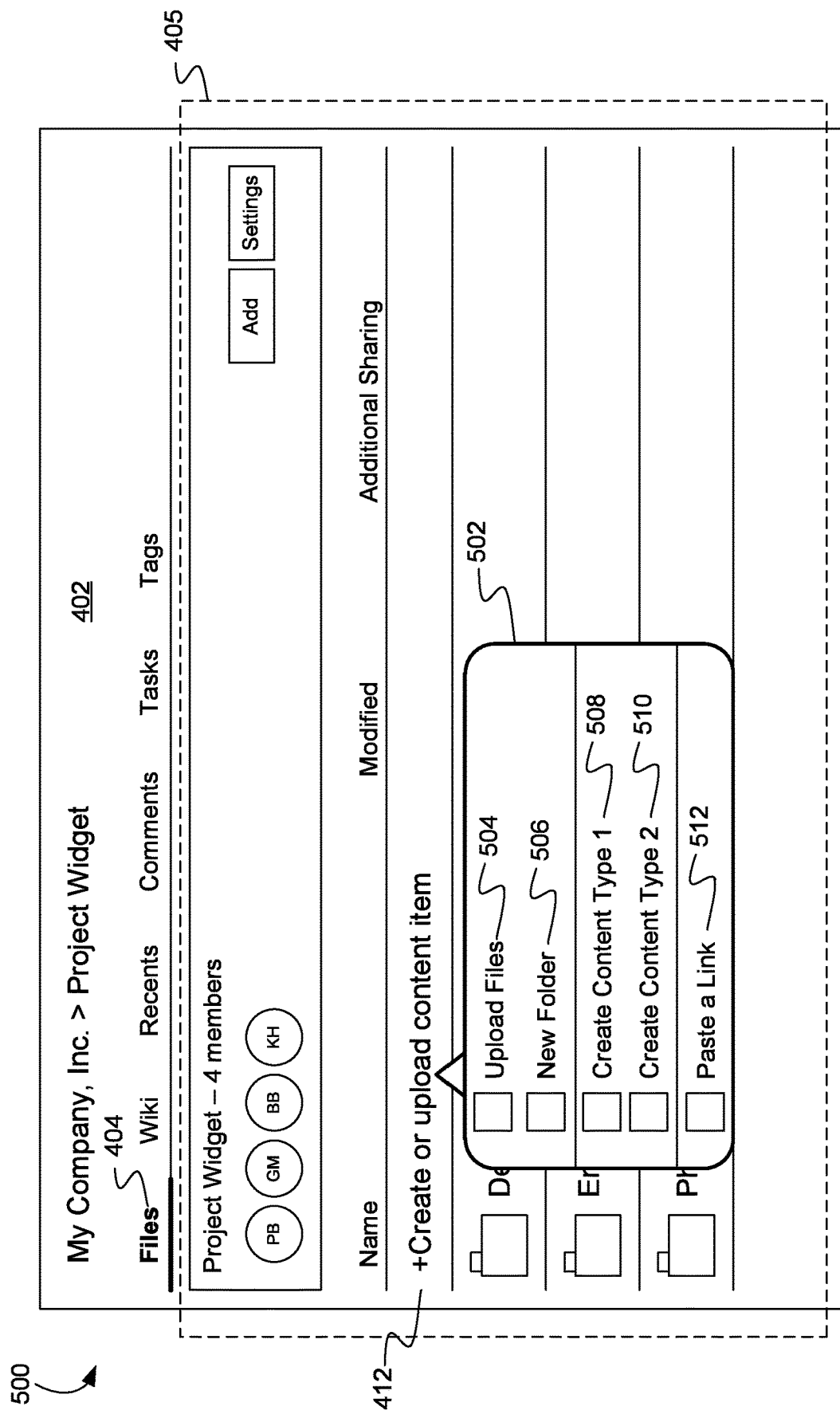
FIG. 5 illustrates an example graphical user interface for adding a new content item to a project.

FIG. 5 illustrates an example graphical user interface 500 for adding a new content item to a project. For example, in response to receiving a user selection of graphical element 420, CMS client 242 can present graphical element 502 (e.g., a popup, a menu, etc.) on a display of client device 240.

In some implementations, graphical element 502 can present options for adding new content items to the selected project. For example, graphical element 502 can include graphical element 504 for uploading a file to the selected project. A user can select graphical element 504 to cause CMS client 242 to present a file browser that allows the user to select a content item to upload to the selected project folder managed by content management system 106. Graphical element 502 can include graphical element 506 for creating a new folder in the selected project. A user can select graphical element 506 to cause CMS client 242 to present a new folder dialog box that allows the user to create and name a new folder within the selected project folder managed by content management system 106. Graphical element 502 can include graphical elements 508 and/or 510 for creating a new content item of a particular type in the selected project. A user can select graphical element 508 or 510 to cause CMS client 242 to present a new content item dialog box that allows the user to create and name a new content item of a specific type within the selected project folder managed by content management system 106. Graphical element 502 can include graphical element 512 for adding a link to a content item in the selected project. A user can select graphical element 512 to cause CMS client 242 to present a dialog box that allows the user to specify a link to a content item to add to the selected project folder managed by content management system 106. After the user has added a new content item, folder, or link to the selected project folder, CMS client 242 can present the new content item, folder, or linked content item, as illustrated by FIG. 6.

Figure 6:
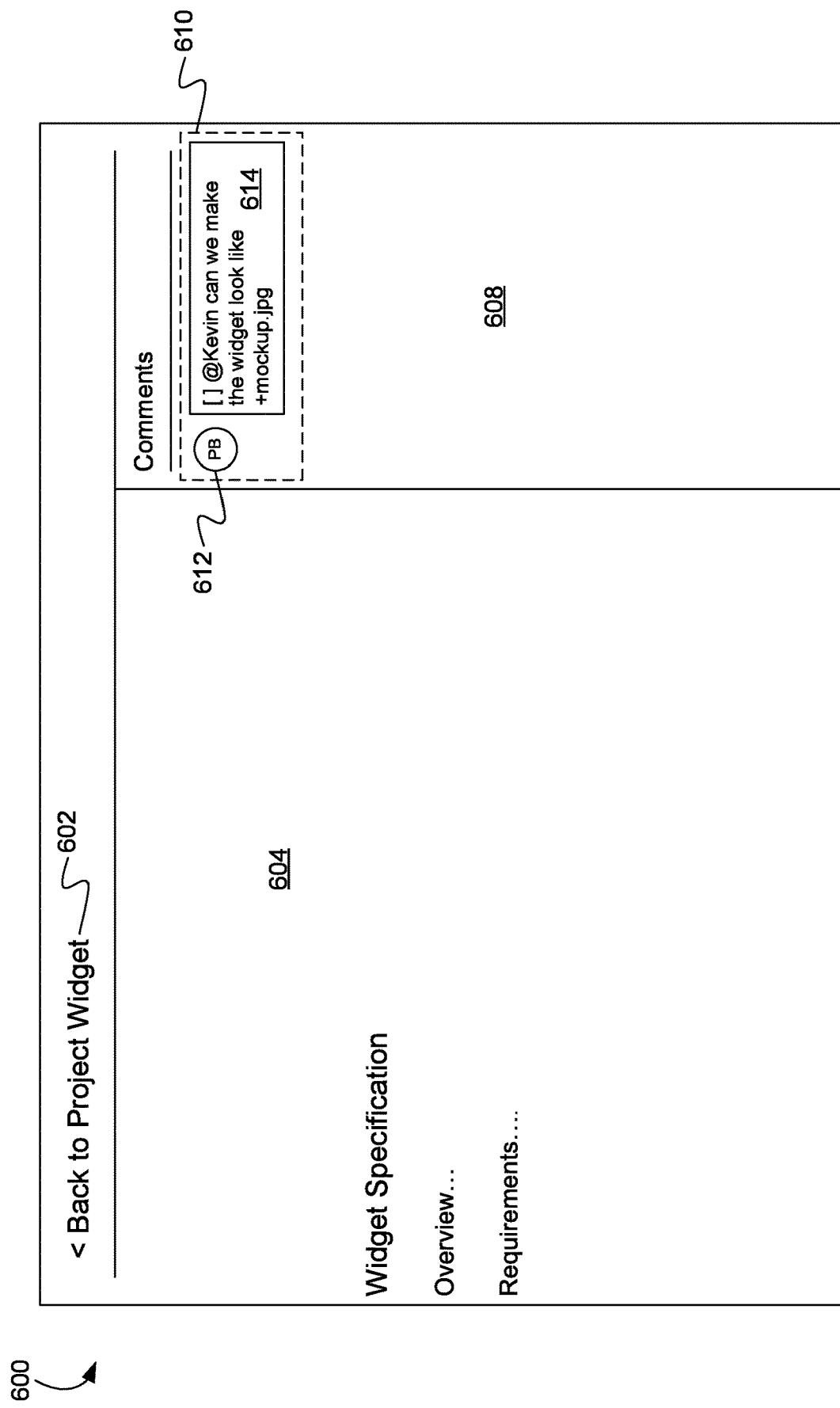
FIG. 6 illustrates an example graphical user interface for presenting a view of a content item added to the selected project folder.

FIG. 6 illustrates an example graphical user interface 600 for presenting a view of a content item added to the selected project folder. For example, GUI 600 can be presented by CMS client 242 on a display of client device 240. GUI 600 can include graphical element 602 for returning to a project folder view. For example, the user can select graphical element 602 to cause CMS client 242 to present GUI 400, GUI 800, etc., on a display of client device 240.

In some implementations, GUI 600 can include content area 604. For example, content area 604 can present the content of a selected, newly added, or newly created content item in project folder 304. Content area 604 can present a static preview (e.g., image) of content. Content area 604 can provide an editor interface for editing or modifying the content of the corresponding content item.

In some implementations, GUI 600 can include comments area 608 where a user can add or view comments on the content item. For example, the user can select area 608 to invoke a text input area. The user can provide textual input to create a comment and the comment can be presented in comments area 608. For example, the user can create or view comment entry 610. Comment entry 610 can include a graphical representation 612 of the user who created comment entry 610. Comment entry 610 can include textual comment data 614. In some implementations, the user can provide text input that includes special expressions or characters that can be interpreted by CMS client 242 and/or project module 202. As described above, special characters can be input by the user to add a user identifier or a content item identifier to the comment. Special characters can be input by the user to create a task based on a comment, as described with reference to FIG. 7 below.

Figure 7:
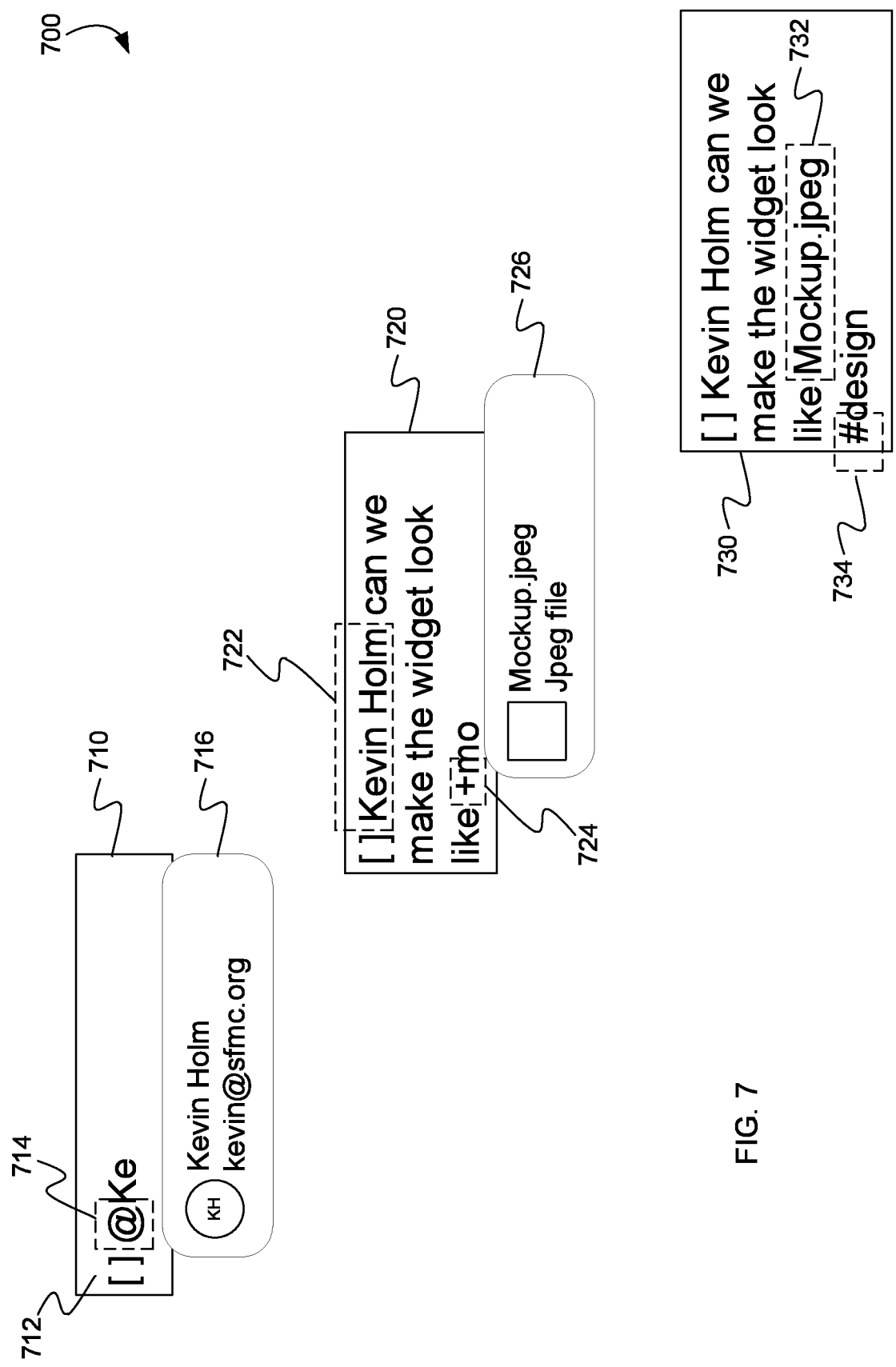
FIG. 7 illustrates an example text that includes special expressions.

FIG. 7 illustrates an example text 700 that includes special expressions. For example, as the user provides text input to generate comment 700, the user can type in special characters and/or special expressions that CMS client 242 and/or project module 202 can interpret to have special meaning. FIG. 7 illustrates how CMS client 242 and/or project module 202 react to detecting special characters and/or special expressions in comments, content, tasks, or any other textual data managed by content management system 106.

As illustrated FIG. 7, the user has provided text input 710 and included task prefix 712 (e.g., "[ ]") at the beginning of text input 710. CMS client 242 and/or project module 202 can interpret task prefix 712 as an indication that the user wishes text input 710 to be automatically converted by CMS client 242 and/or project module 202 into a task for the corresponding project.

Additionally, text input 710 includes user identifier prefix 714 (e.g., "@") followed by the first few characters of a user identifier. CMS client 242 and/or project module 202 can interpret the identifier prefix 714 as an indication that the user wishes to insert a user identifier into text input 710. When CMS client 242 and/or project module 202 detects user identifier prefix 714, CMS client 242 can present suggestion 716 including suggestions for content management system user identifiers that match the characters that follow user identifier prefix 714. In the example of FIG. 7, user identifier prefix 714 is followed by the characters "Ke" and CMS client 242 has found a user identifier "Kevin Holm" that matches the characters "Ke." CMS client 242 can present the user identifier "Kevin Holm" in suggestion 716 and the user can select suggestion 716 to have the suggested user identifier added to text input 710. While FIG. 7 illustrates only one suggested user identifier, CMS client 242 can present multiple user identifiers when multiple user identifiers match the sequence of characters following user identifier prefix 714.

In some implementations, the user can continue providing text input to text input 710 to generate text input 720. As illustrated by FIG. 7, after the user selects user identifier suggestion 716, user identifier prefix 714 can be removed (e.g., replaced) by the selected user identifier 722.

Additionally, the user can provide text input for linking a content item to text input 720. For example, the user can provide text input 720 including a content item identifier prefix 724 (e.g., "+") followed by a few characters of a content item identifier. When CMS client 242 and/or project module 202 detects the content item identifier prefix 724, CMS client 242 can present suggestion 726 including suggestions for content item identifiers that match the characters that follow content item identifier prefix 724. In the example of FIG. 7, content item identifier prefix 724 is followed by the characters "mo" and CMS client 242 has found the content item "Mockup.jpeg" that matches the characters "mo." CMS client 242 can present the content item identifier "Mockup.jpeg" in suggestion 726 and the user can select suggestion 726 to cause CMS client 242 to add a link to Mockup.jpeg to text input 720. While FIG. 7 illustrates only one suggested content item, CMS client 242 can present multiple content items when multiple content item identifiers match the sequence of characters following content item identifier prefix 724.

In some implementations, the user can continue providing text input to text input 720 to generate text input 730. As illustrated by FIG. 7, after the user selects content item suggestion 724, CMS client 242 can replace content item identifier prefix 714 with a link 732 to the selected content item 726.

Additionally, the user can provide text input for adding a tag to text input 730. For example, the user can provide text input 730 including a tag prefix 734 (e.g., "#") followed by a few characters of a tag (e.g., subject, classification, descriptive word or phrase, etc.).

When CMS client 242 detects that the user is finished with text input 730 (e.g., the user submits the comment, closes the corresponding content item, a threshold period of time has elapsed since last input, etc.), CMS client 242 and/or project module 202 can process the comment (or text input) to determine the various attributes of the comment and/or to determine whether to convert the comment into a task. CMS client 242 and/or project module 202 can then store the comment or task and associated attributes (e.g., project identifier attribute, author identifier attribute, source content item attribute, recipient user attribute, linked content item attribute, tag attribute, etc.) in the appropriate database (e.g., comment database 206, task database 208).

Figure 8:
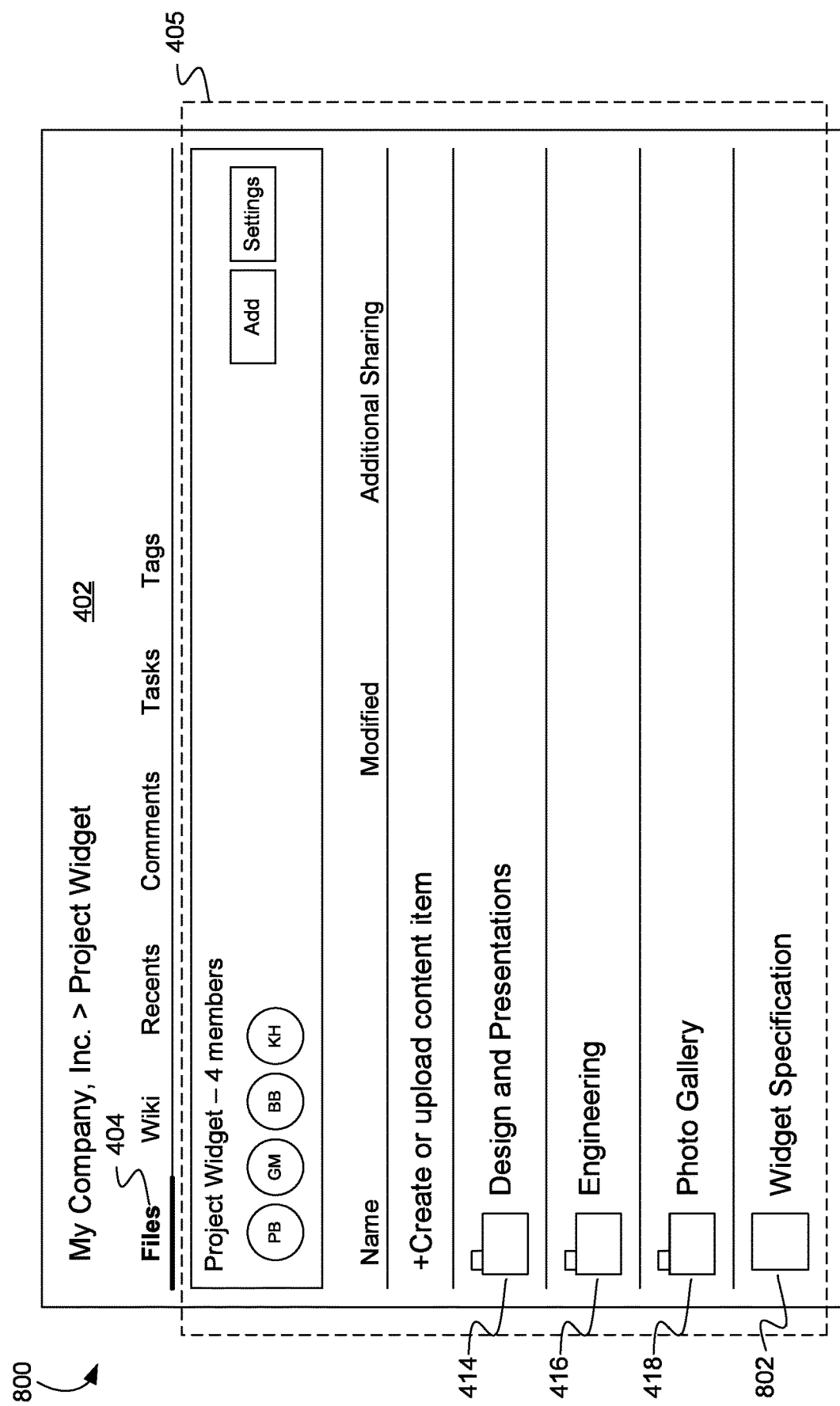
FIG. 8 illustrates an example graphical user interface presenting a content item that was added to the selected project folder.

FIG. 8 illustrates an example graphical user interface 800 presenting a content item that was added to the selected project folder. For example, GUI 800 can be presented by CMS client 242 on a display of client device 240 in response to the user selecting graphical element 602 of FIG. 6. In this example, the user has selected an option from graphical element 502 to add a content item 802 to the selected project folder. When content item 802 is added to the project folder, CMS client 242 and/or project module 202 can read content item 802 and extract comments, tasks, tags, and other project data from the content item. CMS client 242 can add the comments and tasks to comment database 206 and/or tasks database 208, respectively, along with the corresponding attribute data, as described above.

Figure 9:
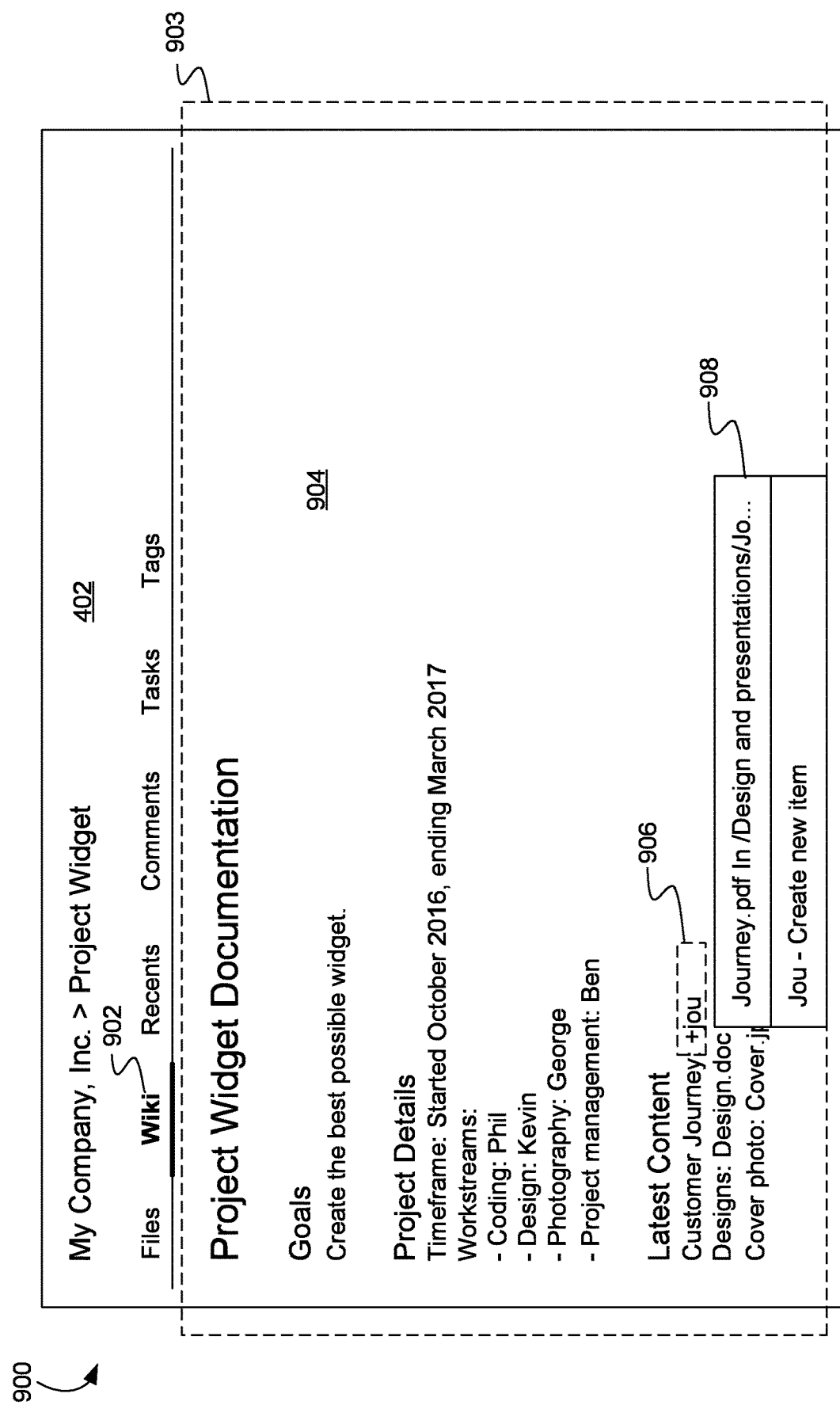
FIG. 9 illustrates an example graphical user interface for presenting a description of the selected project.

FIG. 9 illustrates an example graphical user interface 900 for presenting a description of the selected project. For example, the user can select graphical element 902 to present an informational project data view 903 (e.g., Wiki page, overview, etc.) describing the project, project members, important documents, and/or other information. Project data view 903 can present a content item 904 (e.g., file, document, web page, etc.) generated by one or more of the project members.

In some implementations, a project member can edit content item 904 from within project data view 903 by providing textual input, adding graphics, and/or other content. For example, a project member can edit content item 904 by adding text to content item 904 and CMS client 242 (or project module 202) can interpret special characters, patterns, or expressions in the text as described with reference to FIG. 7. For example, a user who is editing content item 904 can provide string 906 as input. String 906 can include the content item link prefix "+" followed by the characters "jou". CMS client 242 can detect the content item link prefix and, in response to detecting the prefix, determine content items that have identifiers that include the characters following the prefix (e.g., "jou"). CMS client 242 can then present the determined content items as suggestions in graphical element 908 on GUI 900. The user can select one of the suggested content items to cause CMS client 242 to add a link to the content item in content item 904.

In some implementations, graphical element 908 can include a selectable item for creating a new content item having an identifier that matches the characters that follow the content item prefix. When the user selects to create a new content item, CMS client 242 can insert a link to the new content item in content item 904 presented in project data view 903.

Figure 10:
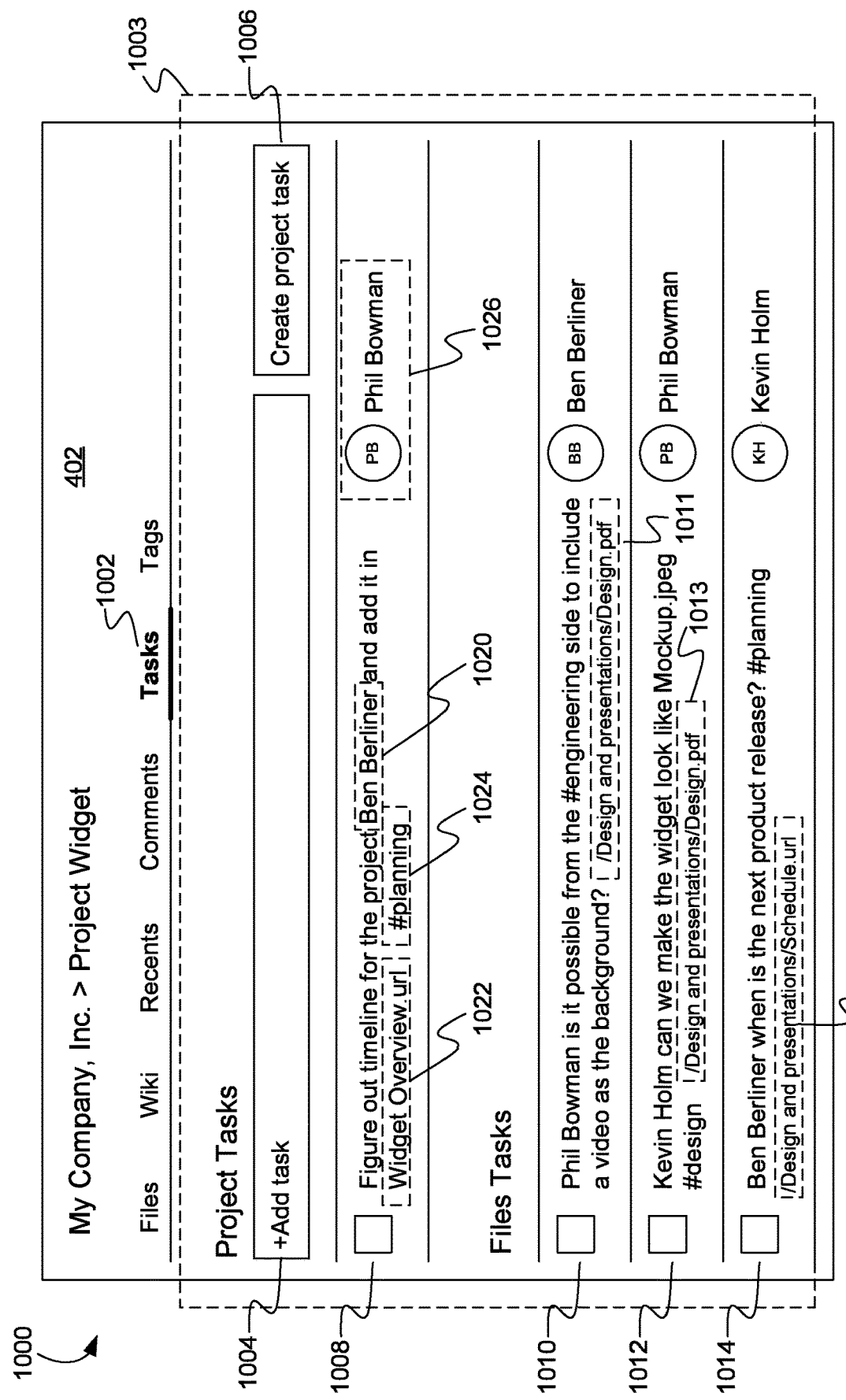
FIG. 10 illustrates an example graphical user interface for presenting tasks associated with the selected project.

FIG. 10 illustrates an example graphical user interface 1000 for presenting tasks associated with the selected project. For example, GUI 1000 can be presented by CMS client 242 in response to receiving a user selection of graphical element 1002 presented in project folder view 402. GUI 1000 can include, for example, project data view 1003 that provides a GUI for managing tasks associated with the currently selected project. For example, tasks can be created at the project level and/or the content item level. Project data view 1003 can present tasks according to whether the task is a project level task or a content item (e.g., file) level task. For example, project level tasks can be presented at the top of project data view 1003 and content item level tasks can be presented below the project level tasks. Other implementations may reverse the order of presentation of the tasks. CMS client 242 can obtain the task information presented in project data view 1003 from task database 208 through project module 202, as described above.

In some implementations, project data view 1003 can include graphical element 1004 and graphical element 1006 for creating a new project level task. For example, the user can select graphical element 1004 (e.g., a text input control) and enter text to describe a new project level task. The user can type text that includes the special characters, patterns, or expressions described above with reference to FIG. 7 to add links to content items, mention other users (e.g., project members) of content management system 106, and/or tag the new task. When other users are mentioned in a task, project module 202 can assign the task to the mentioned user, for example. When the user is done providing text input to graphical element 1004, the user can select graphical element 1006 (e.g., a button) to cause CMS client 242 and/or project module 202 to create the new project level task. When the project level task is created, project module 202 can store the project level task and task attributes (as described above) in task database 208. For example, CMS client 242 can send the description for the new project level task to project module 202 so that project module 202 can determine the attributes of the task and store the task in task database 208.

In some implementations, project data view 1003 can present graphical representations of tasks associated with the selected project. Project data view 1003 can include task 1008. For example, task 1008 can be a project level task created based on user input to graphical element 1004 and graphical element 1006. Project data view 1003 can include tasks 1010, 1012, and/or 1014. Tasks 1010, 1012, and/or 1014 can be content level tasks created when a project member creates a task within or with reference to a project content item.

Each task 1008-1014 can include various attributes. For example, task 1008 can include a task description. The task description can be a textual explanation of task 1008. Task 1008 can include recipient attribute 1020. For example, when a project member is at '@' mentioned in a task, CMS client 242 and/or project module 202 can determine that the mentioned project member has been assigned the task. Task 1008 can include content item attribute 1022. For example, when a project content item is plus '+' mentioned in a task, CMS client 242 and/or project module 202 can create a link to the mentioned content item in the task and determine that the mentioned content item is related to (e.g., is an attribute of) the task. Task 1008 can include tag attribute 1024. When task 1008 includes a tag prefix (e.g., '#' character), CMS client 242 and/or project module 202 can determine a tag attribute for the task based on the string that immediately follows the tag prefix. Task 1008 can include author or creator attribute 1026. For example, CMS client 242 can determine which project member created the corresponding task, as described above. Each content item task 1010, 1012, and/or 1014 can include text or other graphical representation of the content item from within which the corresponding task was created. For example, content item tasks 1010, 1012, and/or 1014 can include source content item attributes 1011, 1013 and/or 1015 respectively. For example, Each of the tasks presented by project data view 1003 can be generated by different project members and/or from within different project content items or different project user interfaces. For example, task 1004 can be generated from within project folder view 402 and/or project data view 1003 while task 1010 can be generated from within a project content item (e.g., content item 802). As another example, task 1010 can be generated from within a content item "Design.pdf" while task 1014 can be generated from within content item "Schedule.url." Task 1010 can be generated by project member "Ben Berliner" while task 1012 was generated by project member "Phil Bowman."

In some implementations, a user can select a task to change the state of the selected task. For example, the user can select a checkbox associated with a task to indicate that the task has been completed. When the user selects the checkbox, CMS client 242 can change the state of the corresponding task to completed and remove the task from project data view 1003.

In some implementations, a user can select a task to modify attributes of the task. For example, the user can select the text description of the task to cause CMS client 242 to present a task editing graphical user interface (e.g., graphical element 1502 of FIG. 15). The user can provide input to cause CMS client 242 to change various attributes of the selected task. CMS client 242 can then send the updated task information to project module 202 for storage in task database 208 and present the updated task information in project data view 1003.

Figure 11:
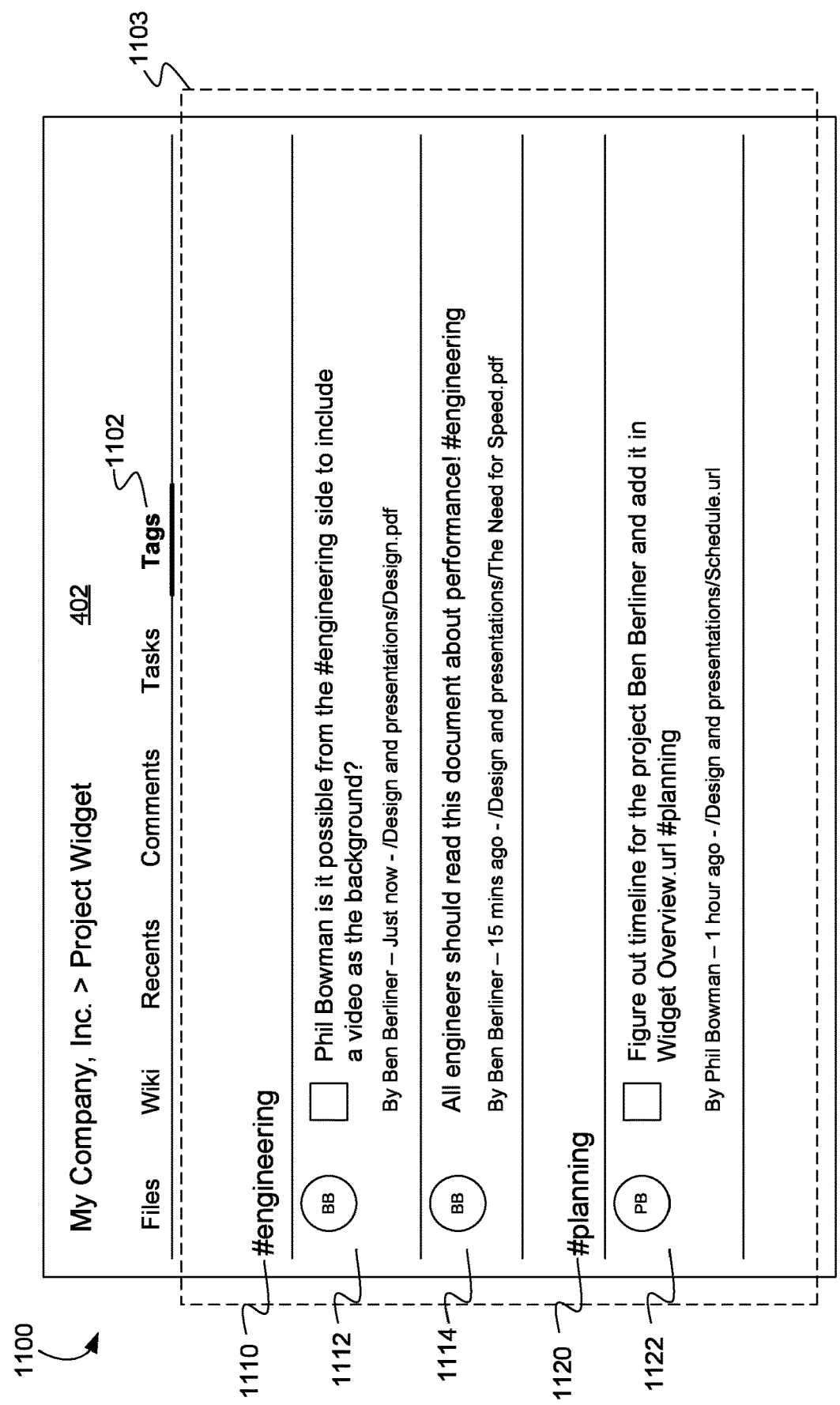
FIG. 11 illustrates an example graphical user interface for presenting tagged project data.

FIG. 11 illustrates an example graphical user interface 1100 for presenting tagged project data. For example, GUI 1100 can be presented by CMS client 242 in response to the user selecting graphical element 1102 presented in project folder view 402. For example, in response to receiving a user selection of graphical element 1102, CMS client 242 can present project data view 1103 that includes representations of tagged project data. CMS client 242 can obtain the tagged project data from comments database 206, tasks database 208, and/or project folder 204 through project module 202.

Alternatively, CMS client 242 can obtain the tagged project data from local project folder 252 on client device 240.

In some implementations, project data view 1103 can present tagged project data organized by tag. For example, a tag can be a string preceded (e.g., prefixed) by a special character or expression. As described above, the prefix for a tag can be the hash character '#'. Example tags can include "#engineering," "#planning," and/or "#design." CMS client 242 can request tagged project data from project module 202. In response to the request, project module 202 can search comments database 206, tasks database 208, and/or project folder 204 for tagged data (e.g., comments, tasks, content items, etc.) and generate a collection of tagged data. In some implementations, the collection of tagged data can be organized or sorted by tag. For example, all "#engineering" tags can be grouped together in the collection. All "#planning" tags can be grouped together in the collection. Alternatively, CMS client 242 can sort the tagged data upon receipt of the collection of tagged data from project module 202. After generating the collection of tagged data, project module 202 can send the collection of tagged project data to CMS client 242 for presentation in project data view 1103.

In some implementations, CMS client 242 can present the tagged project data organized into groups or sections according to the tags associated with the project data, as illustrated by FIG. 11. For example, project data view 1103 can present a group or section 1110 of "#engineering" tags that include tagged project data 1112 and/or 1114. CMS client 242 can include project data 1112 and/or 1114 in section 1110 when CMS client 242 determines that project data 1112 and/or 1114 includes the "#engineering" tag. Similarly, data view 1103 can present a group or section 1120 of "#planning" tags that include tagged project data 1122. CMS client 242 can include project data 1122 in section 1120 when CMS client 242 determines that project data 1122 includes the "#planning" tag.

In some implementations, project data view 1103 can include tagged data of various types and/or from various project members. For example, project data view 1103 can include task 1112 and comment 114 that both include the "#engineering" tag. Project data view 1103 can include comment 114 created by project member "Ben Berliner" that includes the "#engineering" tag and task 1122 created by project member "Phil Bowman" that includes the "#planning" tag. Thus, project data view 1103 can include tags from across project content items, comments, tasks, and/or project members.

Figure 12:
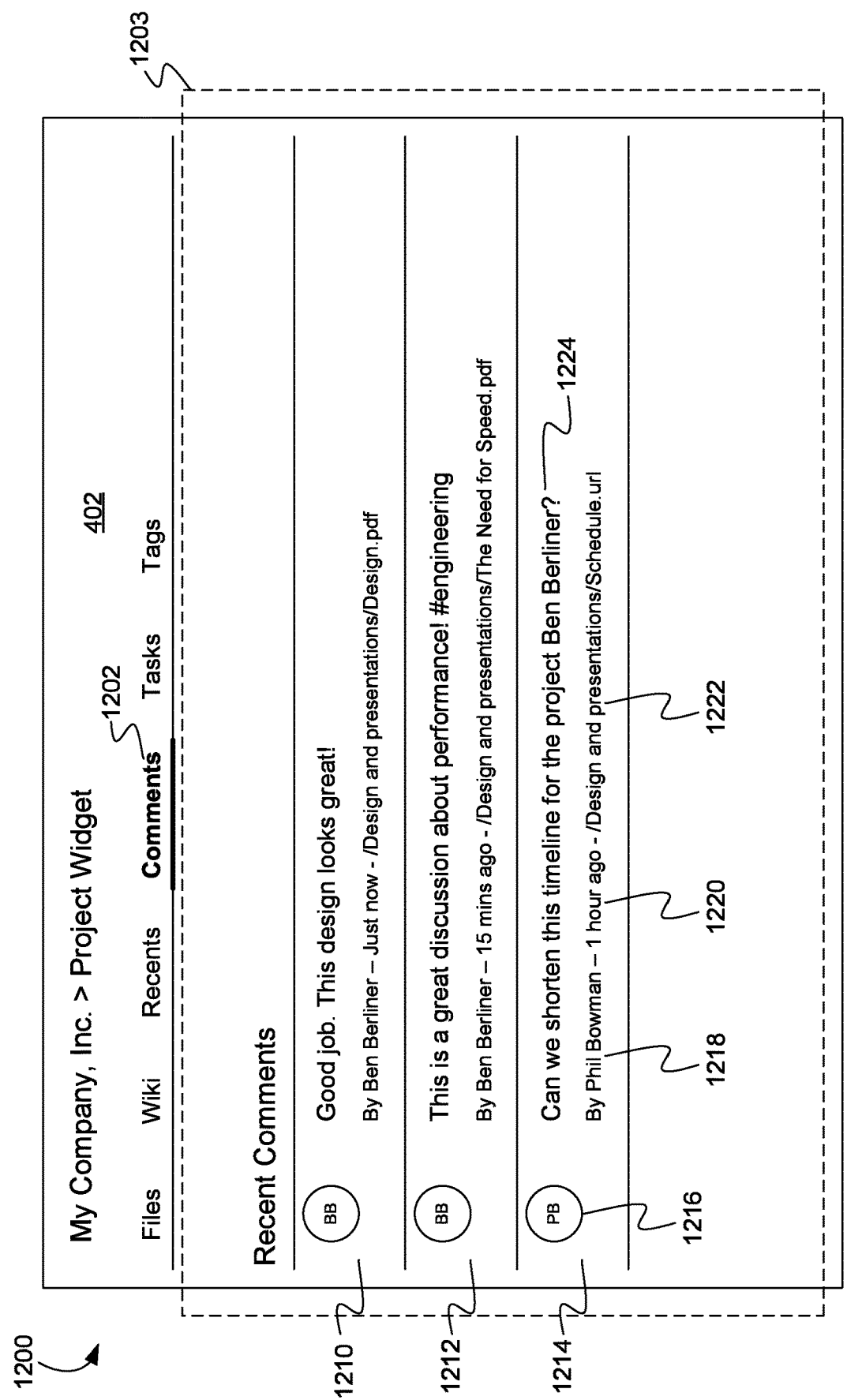
FIG. 12 illustrates an example graphical user interface for presenting comments associated with a project.

FIG. 12 illustrates an example graphical user interface 1200 for presenting comments associated with a project. For example, GUI 1200 can be presented by CMS client 242 in response to the user selecting graphical element 1202 presented in project folder view 402. For example, in response to receiving a user selection of graphical element 1202, CMS client 242 can present project data view 1203 that includes representations of comments associated with the selected project. CMS client 242 can obtain the comments from comments database 206 through project module 202.

Alternatively, CMS client 242 can obtain the comments from local project folder 252 on client device 240.

In some implementations, project data view 1203 can include comments associated with various project content items. For example, project data view 1203 can include comments 1210, 1212 and/or 1214. Comments 1210, 1212 and/or 1214 can be presented, for example, ordered by when the corresponding comment was generated or created. For example, if comment 1210 is the most recent (e.g., newest) comment, comment 1210 can be presented at the top of project data view 1203. Comments 1212 and 1214 can be listed below comment 1210 in time order from newest to oldest. In some implementations, comments can be presented in time order where the comment at the bottom of project data view 1203 is the newest and increasingly older comments are presented toward the top of project data view 1203. Each comment 1210, 1212 and/or 1214 can include an identifier (e.g., graphical element 1216, text 1218) for author of the comment, an indication 1220 of when the comment was created, an identifier 1222 for the content item in which the comment was created, and/or text 1224 representing the comment.

Figure 13:
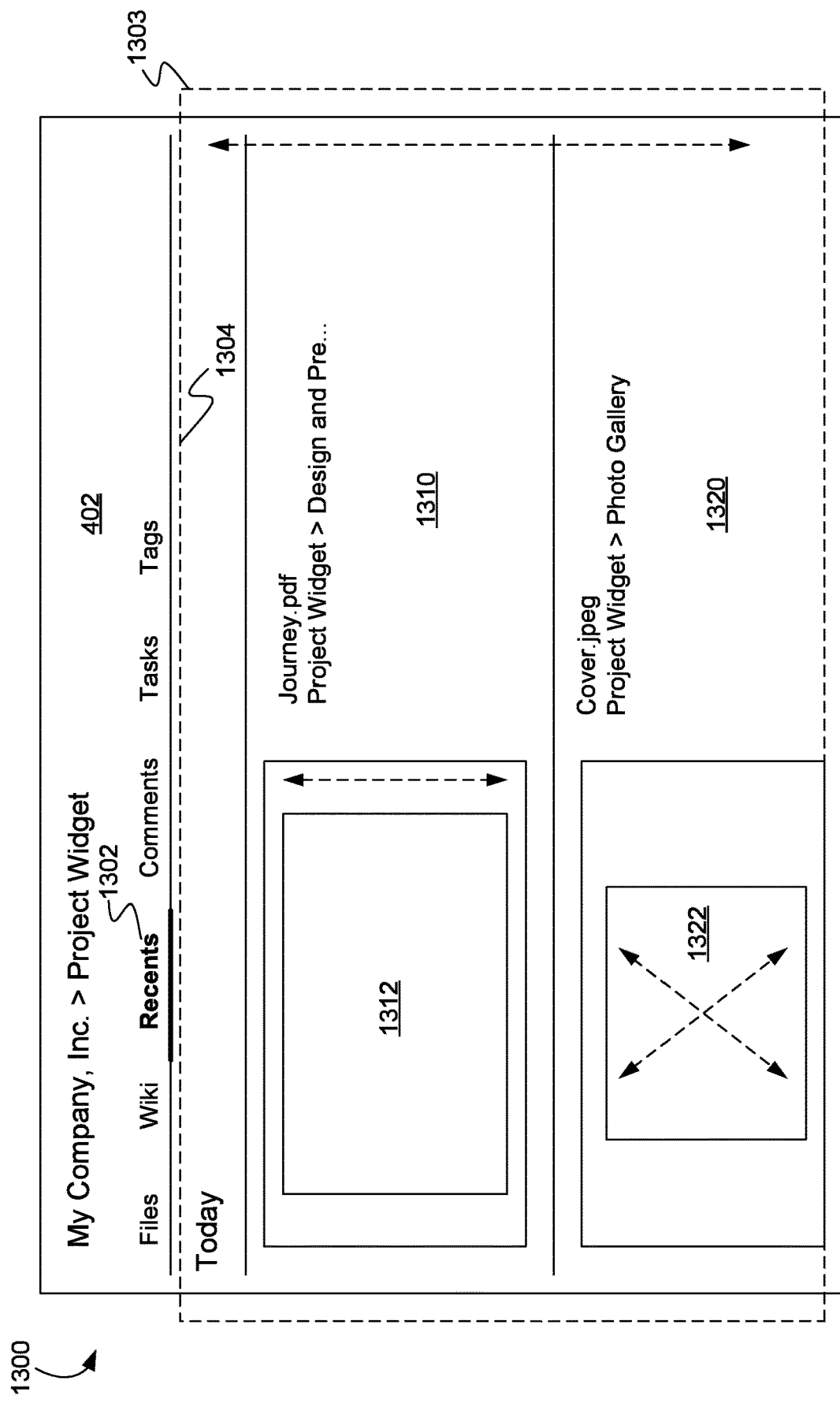
FIG. 13 illustrates an example graphical user interface presenting recently accessed content items.

FIG. 13 illustrates an example graphical user interface 1300 presenting recently accessed content items. For example, GUI 1300 can be presented by CMS client 242 in response to receiving user input selecting graphical element 1302 presented in project data view 1303. To generate GUI project data view 1303, CMS client 242 can receive project data from project module 202 indicating times (e.g., timestamps) at which project content items stored in project folder 204 were accessed (e.g., viewed, modified, created, moved, etc.). For example, the timestamps can be determined based on file system data and/or a change log that tracks changes to content items in the project folder. Since project folder 204 is synchronized with project folder 252 on client device 240, the timestamp associated with a content item may represent times at which the corresponding content item was accessed on client device 240. Alternatively, CMS client 242 can determine times (e.g., timestamps) at which project content items stored in project folder 252 were accessed (e.g., viewed, modified, created, moved, etc.). Since project folder 252 is synchronized with project folder 204 on content management system 106, the timestamp associated with a content item may represent times at which the corresponding content item was accessed on content management system 106 or another client device similar to client device 240 (not shown) that has been synchronized with project.

In some implementations, project data view 1303 can include graphical representations of recently accessed project content items. For example, project data view 1303 can include graphical representation 1310 and/or graphical representation 1320 of recently accessed project content items. For example, project data view 1303 can present time ordered representations of recently accessed project content items. CMS client 242 can, for example, generate project data view 1303 by presenting a representation of the most recently accessed project content item (e.g., representation 1310) at the top of project data view 1303 and less and less recent project content items (e.g., representation 1320) in time order below the most recently accessed project content item. A user can scroll project data view 1303 upward to view content items that were accessed in the more distant past, for example.

Each content item representation (e.g., representation 1310, representation 1320, etc.) in project data view 1303 can present an identifier (e.g., name, directory, path, etc.) for the corresponding project content item. Each content item representation in project data view 1303 can present an indication of when the corresponding project content item was last accessed.

In some implementations, each content item representation in project data view 1303 can present a representation of the contents of the corresponding project content item. For example, representation 1310 can include content representation 1312. Representation 1320 can include content representation 1322. For example, content representation 1312/1322 can be a static preview image of the content of the corresponding content item. Alternatively, content representation 1312/1322 can be an editable or modifiable representation of the corresponding content item. In some implementations, the user can provide input to content representation 1312/1322 to scroll, zoom, print, or perform some other action with respect to the content presented in content representation 1312/1322. In some implementations, the user can select content representation 1312/1322 or corresponding content item identifier to open the corresponding content item in an editor application for the selected content item.

Figure 14:
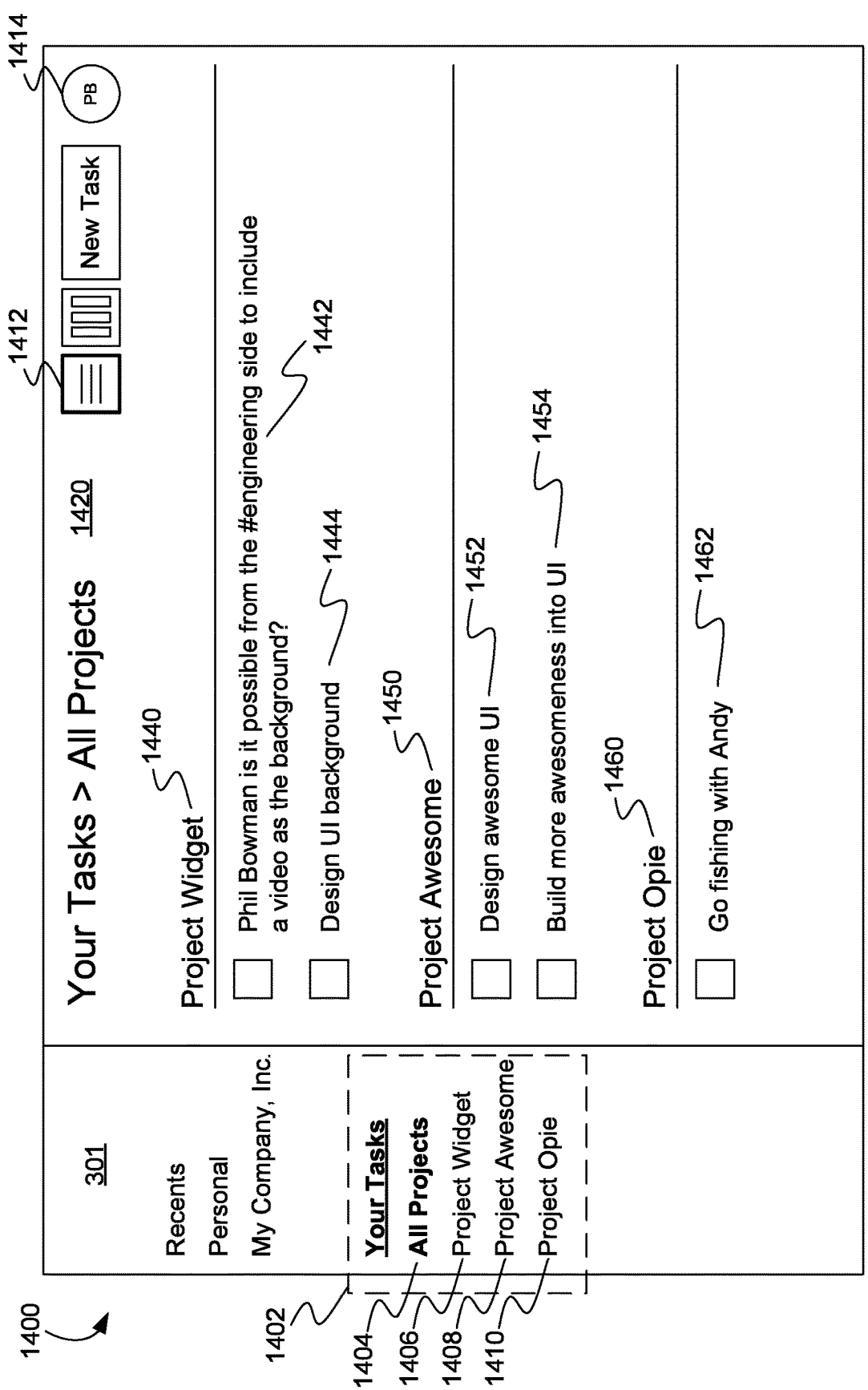
FIG. 14 illustrates an example graphical user interface for presenting tasks associated with a particular user of a content management system.

FIG. 14 illustrates an example graphical user interface 1400 for presenting tasks associated with a particular user of content management system 106. For example, GUI 1400 can be presented by CMS client 242 on a display of client device 240 in response to the user selecting graphical element 1404 from task menu 1402. For example, task menu 1402 can be presented in side panel 301 on GUI 1400 and/or any of the other graphical user interfaces described herein.

In some implementations, GUI 1400 can present user task view 1420. For example, user task view 1420 can present tasks associated with a specific user. For example, if the user "Phil Bowman" (e.g., as indicated by graphical element 1414) is using client device 240 and/or CMS client 242 and has logged into content management system 106, user task view 1420 can present tasks associated with (e.g., created by, assigned to, etc.) the user "Phil Bowman." CMS client 242 can obtain task information describing tasks associated with the user for presentation in user task view 1420 from tasks database 208 through project module 202, for example. Alternatively, CMS client 242 can obtain task information describing tasks associated with the user locally from managed content 250 on client device 240.

In some implementations, the tasks in user task view 1420 can be presented in a list view as illustrated by GUI 1400 and indicated by graphical element 1412. For example, user task view 1420 can present tasks arranged or prioritized by due date. User task view 1420 can filter tasks by due date. For example, user task view 1420 can present tasks that are due within the next 7 days, 10 days, 2 weeks, etc. User task view 1420 can present tasks that are incomplete and/or in progress.

In some implementations, user task view 1420 can present tasks from across different projects. For example, when the user selects graphical element 1404, CMS client 242 can present tasks associated with the user and from various projects managed by content management system 106. For example, user task view 1420 can present tasks 1442 and 1444 associated with the particular user and from project 1440 (e.g., "Project Widget"). User task view 1420 can present tasks 1452 and 1454 associated with the particular user and project 1450 (e.g., "Project Awesome"). User task view 1420 can present task 1462 associated with the particular user and project 1460 (e.g., "Project Opie"). As described above, the user can select a task or task checkbox to change the state of the corresponding task.

In some implementations, user task view 1420 can present tasks associated with a particular project. For example, the user can select graphical element 1406 to cause user task view 1420 to filter tasks by project. In other words, when graphical element 1406 is selected, user task view 1420 can present tasks associated with a project associated with graphical element 1406 while hiding (e.g., not showing, filtering out, etc.) tasks associated with other projects. Thus, when CMS client 242 receives a selection of graphical element 1406, CMS client 242 can generate and present user task view 1420 that includes tasks 1442 and 1444 associated with project 1440 while hiding tasks 1452, 1454, and 1462 associated with projects 1450 and 1460. Similarly, when CMS client 242 receives a selection of graphical element 1408, CMS client 242 can present user task view 1420 that includes tasks associated with project 1450 and hides tasks associated with project 1440 and 1460. When CMS client 242 receives a selection of graphical element 1410, CMS client 242 can present user task view 1420 that includes tasks associated with project 1460 and hides tasks associated with project 1440 and 1450.

Figure 15:
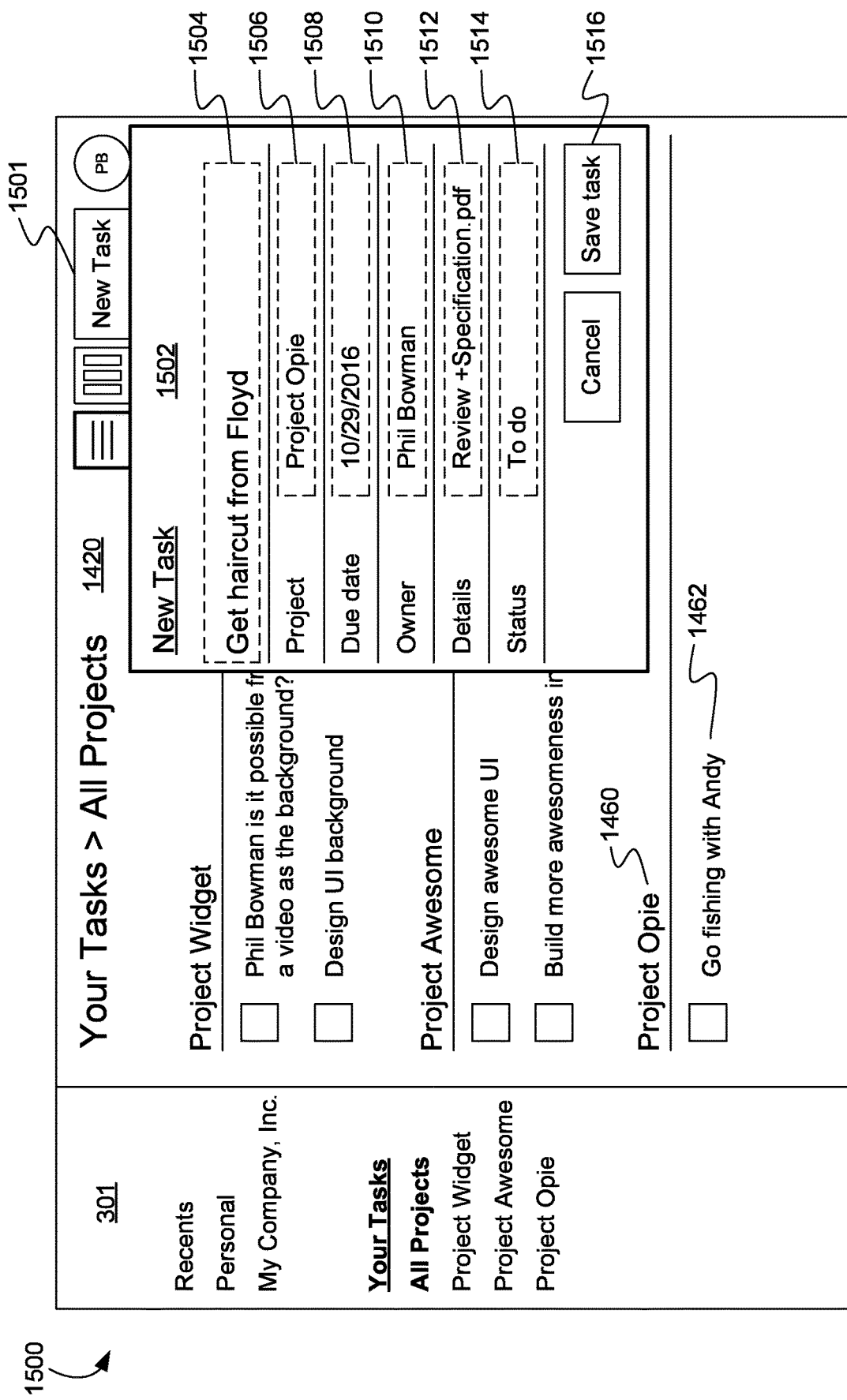
FIG. 15 illustrates an example graphical user interface for creating a new task.

FIG. 15 illustrates an example graphical user interface 1500 for creating a new task. For example, GUI 1500 can correspond to GUI 1400 of FIG. 14. CMS client 242 can present GUI 1500 in response to the user selecting graphical element 1501 presented in user task view 1420, for example. In response to receiving the user selection of graphical element 1501, CMS client 242 can present graphical element 1502 (e.g., a window, a popup, a dialog box) on GUI 1500.

In some implementations, graphical element 1502 can include input controls for defining a new task. The input controls can include text input boxes, pull down menus, calendar controls, and/or other well-known user input controls. The text input controls can receive text input including the special characters, expressions, prefixes, etc., described above with reference to FIG. 7 and CMS client 242 can interpret, translate, or convert the prefixed text into task attributes, as described above. When the user provides text input into the text controls, CMS client 242 can present suggestions for users, project members, content items, etc., based on the text input, as described above with reference to FIG. 7.

In some implementations, graphical element 1502 can include input control 1504 for describing the new task. For example, the user can provide text input to input control 1504 to provide a title, subject, and/or description of the new task. Graphical element 1502 can include input control 1506 for associating the new task with a project. For example, the user can provide text input to input control 1506 to provide an identifier for a project with which the new task is associated. Graphical element 1502 can include input control 1508 for specifying a due date for the new task. For example, the user can provide text input to input control 1506 to specify a date when the task is due for completion. Alternatively, input control 1506 can present a calendar representation that allows the user to select a due date from the calendar representation.

In some implementations, graphical element 1502 can include input control 1510 for assigning the task to a user of content management system 106. For example, the user can provide text input to input control 1510 specifying the name of a user to whom the task is assigned. Graphical element 1502 can include input control 1512 for providing details about the task. For example, the user can provide text input to input control 1512 to provide a summary description of the task, indicate related content items, indicate related users or project members, and/or include tags or any other information relevant to the new task. Graphical element 1502 can include input control 1514 for indicating a current state or status of the new task. For example, the user can provide text input specifying the current status of the new task. When input control 1514 is a pull down menu control, the user can select the current status of the task from a set of predefined statuses (e.g., to do, in progress, completed, etc.). When the user is done defining the task in graphical element 1502, the user can select graphical element 1516 (e.g., a button) to cause CMS client 242 to save the new task in project folder 252 and/or in task database 208 through project module 202.

FIG. 16 illustrates an example graphical user interface 1600 presenting a newly created task. For example, GUI 1600 can correspond to GUI 1400 of FIG. 14. CMS client 242 can present GUI 1600 in response to the user selecting graphical element 1516 to save a new task. For example, GUI 1600 can present task 1602 associated with project 1460 as defined based on the user input received by graphical element 1502.

Figure 17:
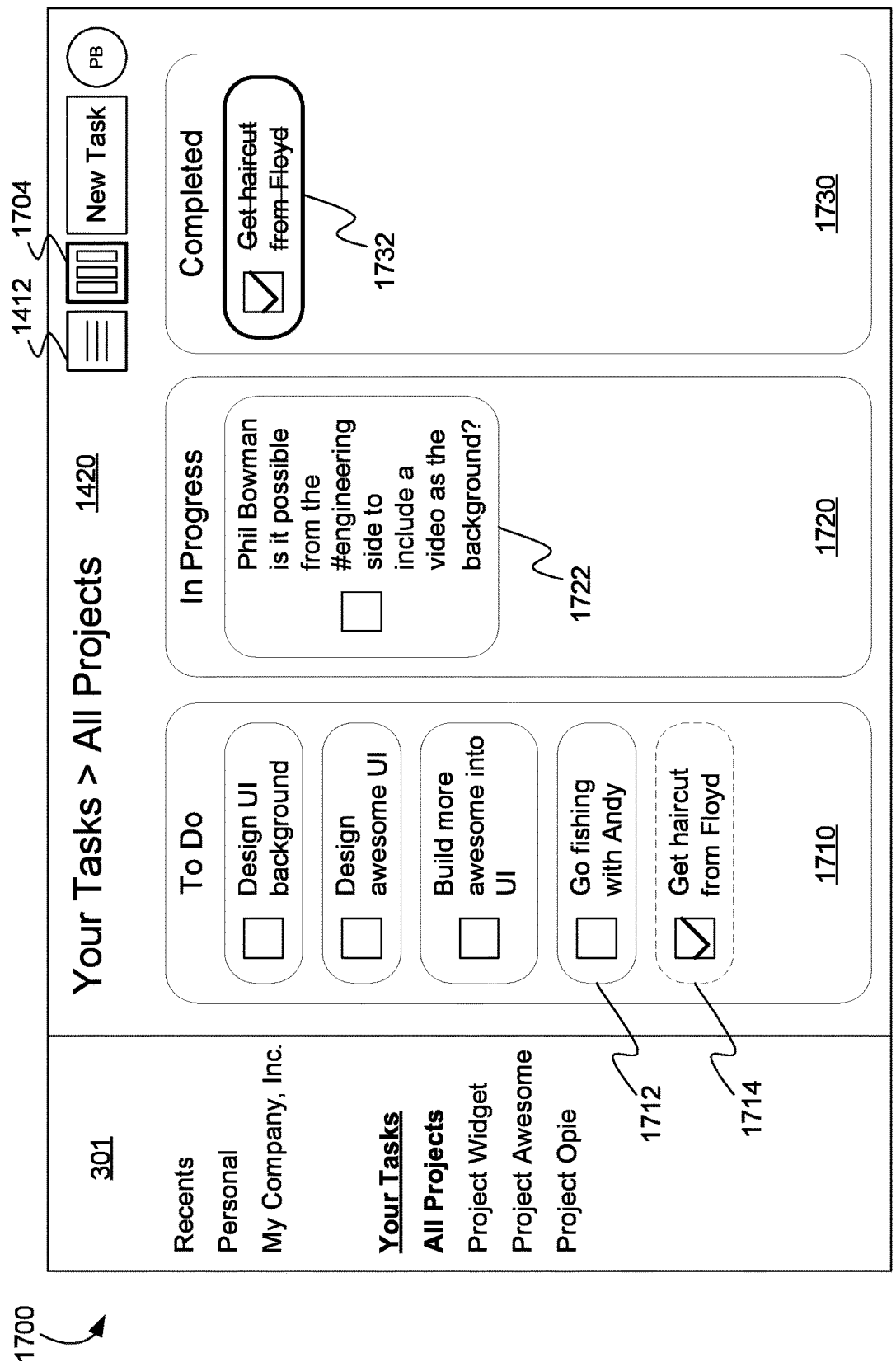
FIG. 17 illustrates an example graphical user interface presenting a column view of tasks associated with the user.

FIG. 17 illustrates an example graphical user interface 1700 presenting a column view of tasks associated with the user. For example, CMS client 242 can present a columnar representation of user task view 1420 in response to the user selecting graphical element 1704. The user can, for example, switch between a list view and task view of user by selecting graphical element 1412 (e.g., for list view) and/or graphical element 1704 (e.g., for column view), respectively.

When presenting a column view of user tasks on user task view 1420, CMS client 242 can present graphical elements 1710, 1720, and/or 1730 representing respective task states. Each graphical element 1710, 1720, and/or 1730 can define an area (e.g., columns, rows, sections, etc.). A task can be presented within the area of a graphical element 1710, 1720, and/or 1730 when the current state of the task corresponds to the task state represented by the corresponding graphical element 1710, 1720, and/or 1730. For example, graphical element 1710 can represent a "to do" state indicating that corresponding tasks 1712, and/or 1714 have not yet been started. Graphical element 1720 can represent a "in progress" state indicating that corresponding task 1722 has been started but not yet completed. Graphical element 1730 can represent a "completed" state indicating that corresponding task 1732 has been completed. Other graphical elements may be presented representing other task states.

In some implementations, a user can provide input to user task view 1420 to change the state of a task. For example, the user can select the checkbox within task 1714 to indicate that task 1714 has been completed. Upon receiving the user input indicating that task 1714 has been completed, CMS client 242 can present a representation 1732 of task 1714 that indicates that task 1714 has been completed within the area defined by graphical element 1730. For example, CMS client 242 can remove task 1714 from graphical element 1710 and present task 1714 (now task 1732) within the area defined by graphical element 1730.

Figure 18:
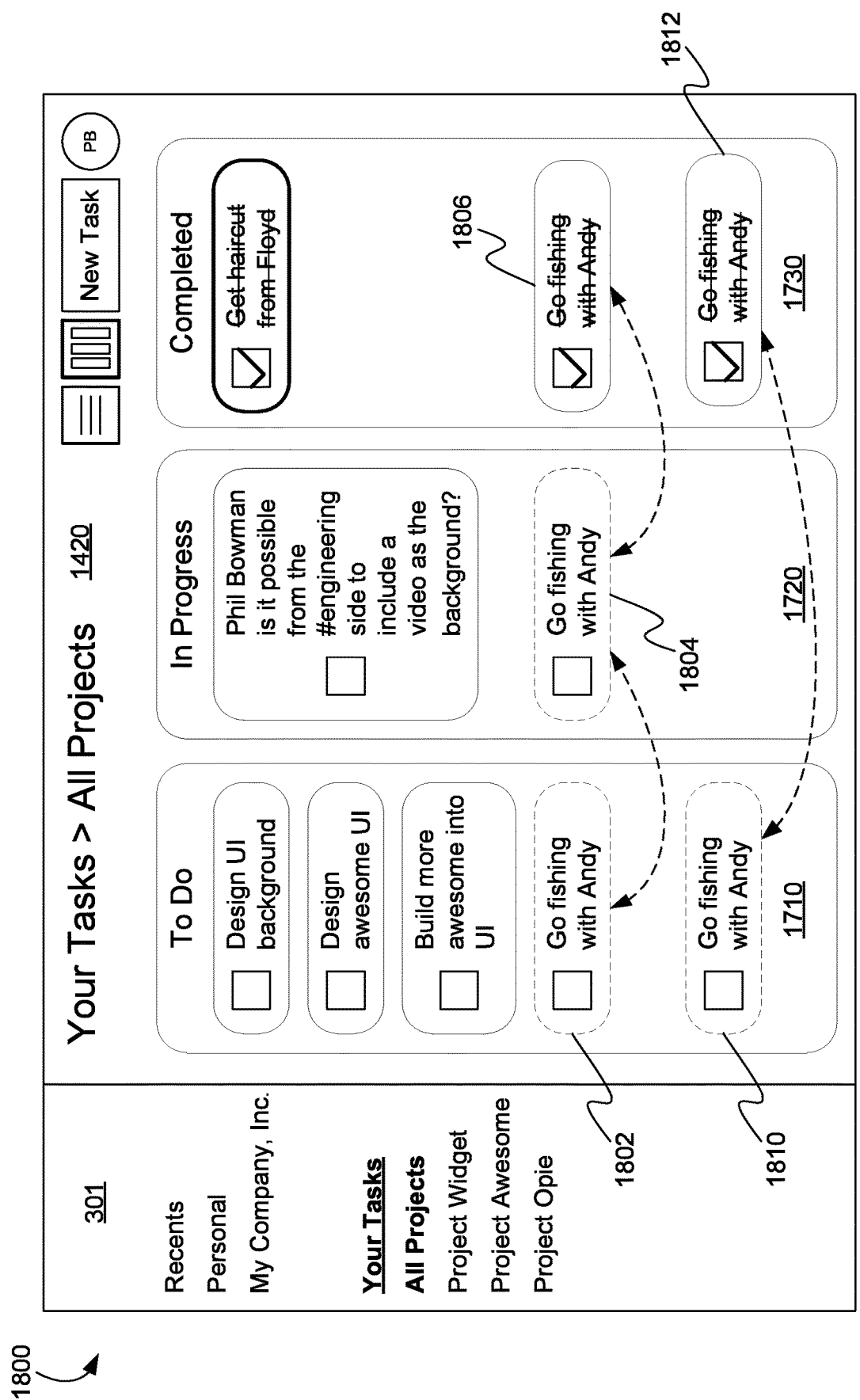
FIG. 18 illustrates an example graphical interface for changing the state of a task.

FIG. 18 illustrates an example graphical interface 1800 for changing the state of a task. For example, GUI 1800 can correspond to GUI 1700 of FIG. 17 described above.

In some implementations, a user can change the state of a task by dragging and dropping tasks into the areas defined by graphical elements 1710, 1720, and/or 1730. For example, the user can select and drag task 1802 from graphical element 1710 into graphical element 1720 to cause CMS client 242 to change the state of task 1802 from "to do" to "in progress." Similarly, the user can select and drag task 1804 from graphical element 1720 into graphical element 1730 to cause CMS client 242 to change the state of task 1802 from "in progress" to "completed." The user can select and drag task 1810 from graphical element 1710 into graphical element 1730 to cause CMS client 242 to change the state of task 1810 from "to do" to "completed," as indicated by task 1730. The user can also provide input to change task states by moving tasks from graphical elements 1730 and/or 1720 to graphical elements 1710 and 1720, for example. When the user changes the state of a task, CMS client 242 can send the updated task information, including the changed task state, to project module 202 for storage in task database 208 managed by content management system 106.

Example Processes

Figure 19:
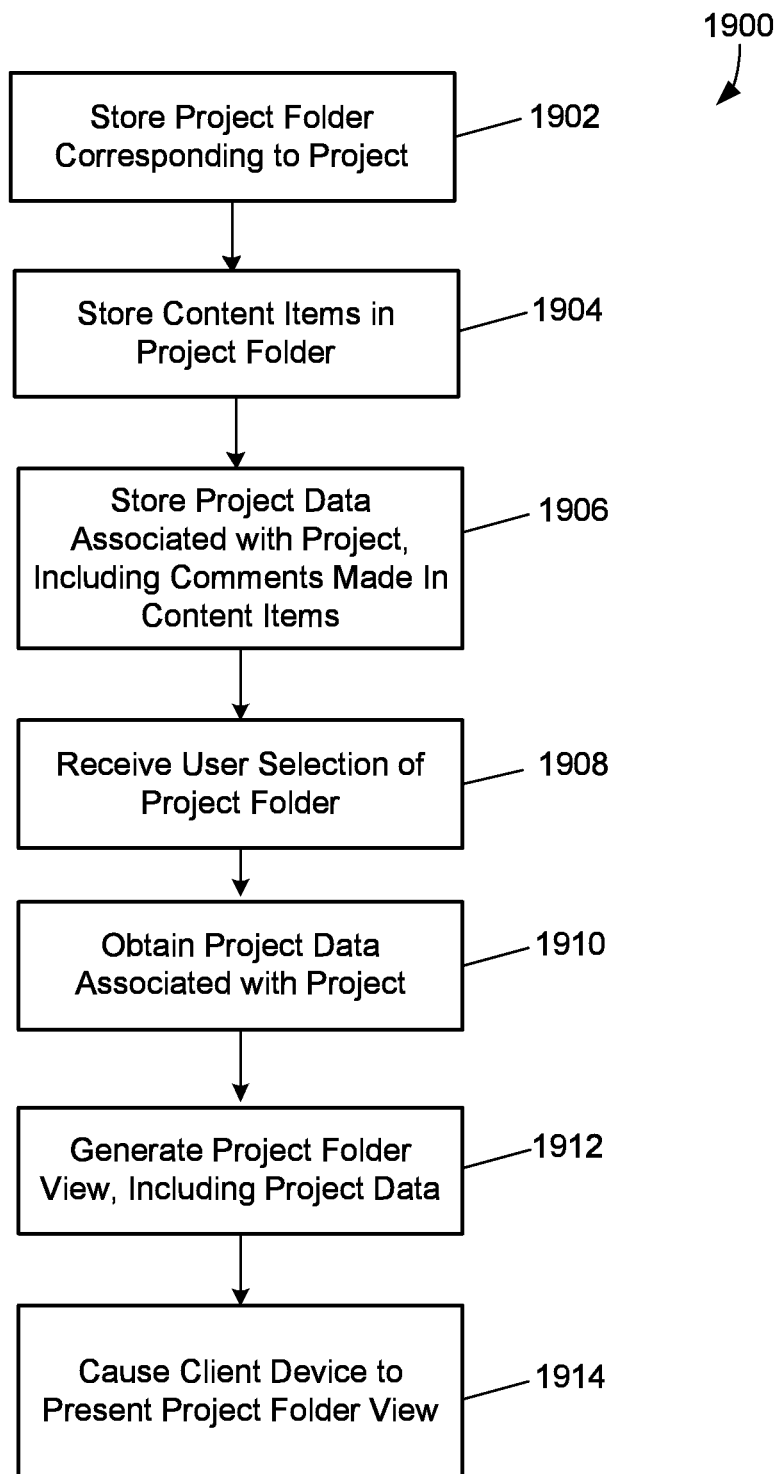
FIG. 19 is an example process for managing projects in a content management system.

FIG. 19 is an example process 1900 for managing projects in a content management system. For example, process 1900 can be performed by CMS client 242 and/or project module 202 to manage project data and present graphical user interfaces that allow a user (e.g., project member) to view and manage project data within a single project management application and/or graphical user interface. The steps below are described with reference to a computing device that performs operations described at each step. The computing device can correspond to a server corresponding to content management system 106 and/or client device 240. The steps can be performed by project module 202 and/or CMS client 242.

At step 1902, a computing device can store a project folder corresponding to a project. For example, the project folder can be a shared folder. The computing device can share the shared folder members (e.g., users) of the project who are collaborating on project tasks, content items, etc., to achieve a project goal. The computing device can create the project folder in response to receiving input from a user of content management system 106 to create a new shared folder managed by content management system 106.

At step 1904, the computing device can store content items in the project folder. For example, the computing device can store a content item in the project folder in response to a user uploading a content item to the project. The computing device can store a content item in the project folder in response to a user creating a new content item in the project or project folder view, as described above. The computing device can store a content item in the project folder in response to a user moving a content item into the project folder using standard file system operations. The computing device can store a content item in the project folder in response to a user linking to or mentioning a content item in a comment, task, or other interaction with CMS client 242.

At step 1906, the computing device can store project data associated with the project. For example, the content items stored in the project folder can include comments, tasks, tags and other project data. The computing device can read the content items to determine comments, tasks, and/or tags included in the project content items and store the comments, tasks, and/or tags in project databases and/or the project folder, as described above. The computing device can store comments, tasks, and/or tag created externally to project content items. For example, the computing device can store comments, tasks, and/or tags created by a user in any of the graphical user interfaces described above.

At step 1908, the computing device can receive a user selection of a project folder. For example, the user can select a project folder from GUI 300 of FIG. 3.

At step 1910, the computing device can obtain project data associated with the project corresponding to the selected project folder. For example, the computing device can obtain project data (e.g., tasks, comments, tags, etc.) from various databases, described above. The computing device can obtain the project data from the project folder stored on a server of content management system 106 or on client device 240. The computing device can obtain the project data from within content items associated with the project and/or stored in the project folder.

At step 1912, the computing device can generate a project folder view. For example, in response to receiving the selection of the project folder and/or obtaining the project data, the computing device can present a project folder view that presents the project data as described above with reference to the graphical user interfaces of FIG. 4 to FIG. 13.

At step 1914, the computing device can cause a client device to present the project folder view. For example, when the computing device is a server of content management system 106 and CMS client 242 is a web browser, the server can send a web page to CMS client 242 to cause CMS client 242 to present the project folder view on a display of client device 240. When the computing device is a server of content management system 106 and CMS client 242 is a native browser, the server can send a project data to CMS client 242 to cause CMS client 242 to present the project folder view in a native GUI of CMS client 242 on a display of client device 240. Alternatively, CMS client 242 on client device 240 can obtain project data from a local synchronized version of the project folder and present the project folder view based on the local project data.

Figure 20:
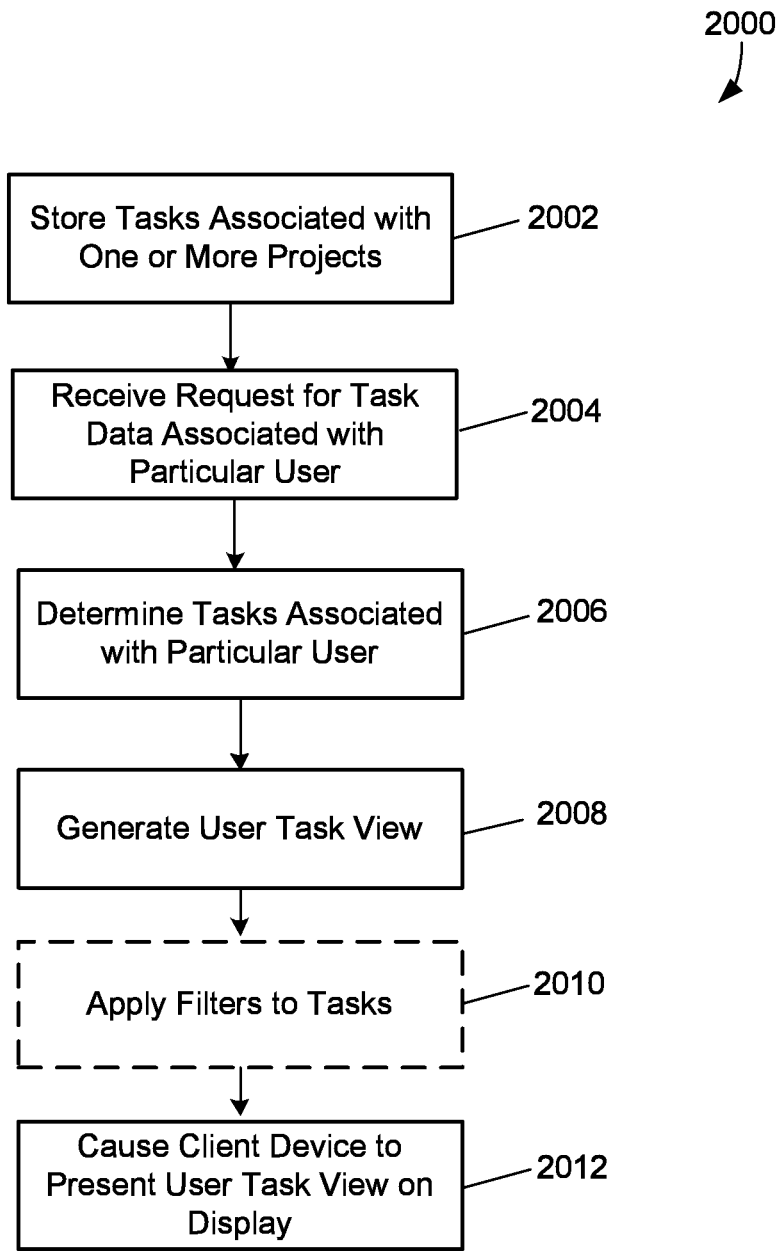
FIG. 20 is an example process for managing tasks in content management system.

FIG. 20 is an example process 2000 for managing tasks in content management system. For example, process 2000 can be performed by CMS client 242 and/or project module 202 to manage user task data and present graphical user interfaces that allow a user (e.g., project member) to view and manage task data. The steps below are described with reference to a computing device that performs operations described at each step. The computing device can correspond to a server corresponding to content management system 106 and/or client device 240. The steps can be performed by project module 202 and/or CMS client 242, for example.

At step 2002, a computing device can store tasks associated with one or more projects. For example, the computing device can store tasks in a task database, as described above. The computing device can store tasks in one or more project folders, as described above.

At step 2004, the computing device can receive a request for task data associated with a particular user. For example, project module 202 can receive from CMS client 242 a request for task data associated with a particular user.

At step 2006, the computing device can determine tasks associated with the particular user. For example, project module 202 can search task database 208 for tasks assigned to and/or created by the particular user.

At step 2008, the computing device can generate a user task view. For example, the user task view can include tasks associated with the particular user, as determined at step 2006. The tasks can be organized in a list view and/or grouped by project, as illustrated by FIG. 14 and FIG. 16. The tasks can be organized in a column view and/or grouped by task state, as illustrated by FIG. 17 and FIG. 18.

At step 2010, the computing device can apply filters to tasks associated with the particular user. For example, step 2008 can be an optional step that applies project filters, time filters, and/or task state filters to tasks associated with the particular user. For example, the computing device can apply a project filter based on a selected project such that tasks not associated with the selected project are filtered out of (e.g., hidden from) the user task view. The computing device can apply a time filter based on a configured amount of time (e.g., 7 days, 2 weeks, one month, etc.) such that tasks that have due dates that are not within the configured amount of time from the present time are filtered out of (e.g., hidden from) the user task view. The computing device can apply a task state filter that filters out tasks from the user task view that are completed or are in some other state.

At step 2012, the computing device can cause a client device to present the user task view on a display of the client device. For example, when the computing device is a server of content management system 106 and CMS client 242 is a web browser, the server can send a web page to CMS client 242 to cause CMS client 242 to present the user task view on a display of client device 240. When the computing device is a server of content management system 106 and CMS client 242 is a native browser, the server can send user task data to CMS client 242 to cause CMS client 242 to present the user task data in a native GUI of CMS client 242 on a display of client device 240. Alternatively, CMS client 242 on client device 240 can obtain user task from managed content 250.

Figure 21A:
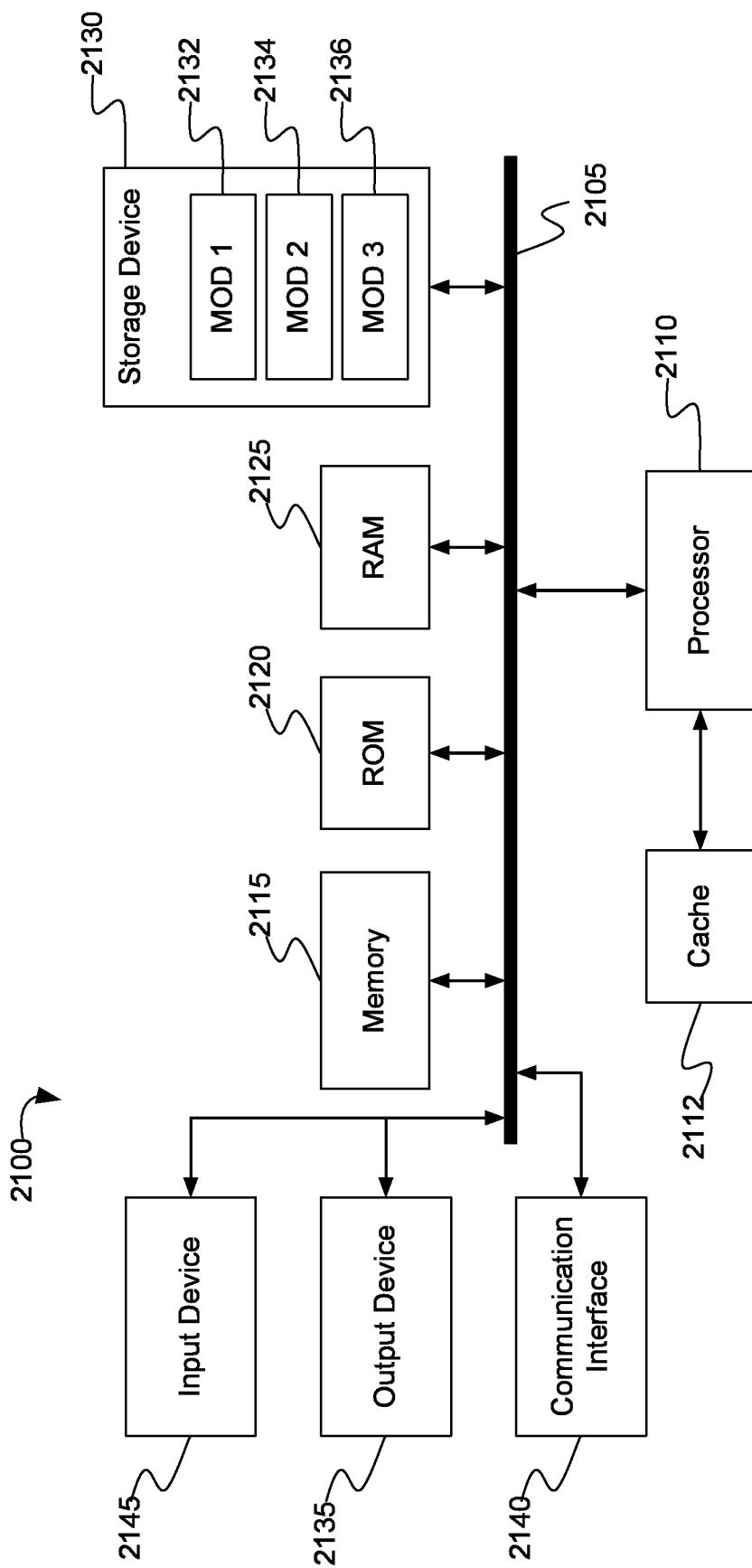
FIG. 21A shows an example possible system embodiment for implementing various embodiments of the present technology.
Figure 21B:
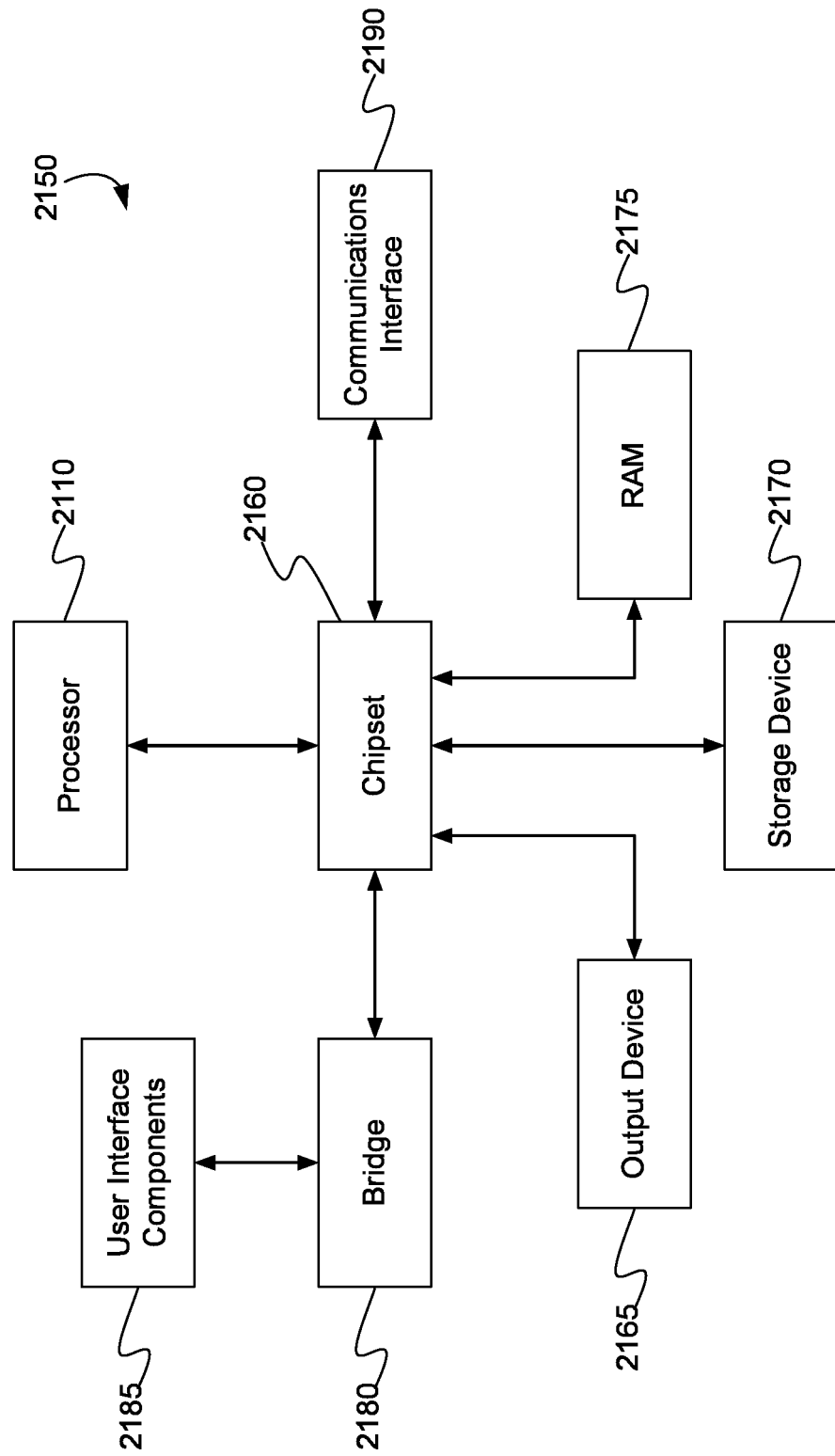
FIG. 21B shows an example possible system embodiment for implementing various embodiments of the present technology.

FIG. 21A and FIG. 21B show example possible system embodiments. The more appropriate embodiment will be apparent to those of ordinary skill in the art when practicing the present technology. Persons of ordinary skill in the art will also readily appreciate that other system embodiments are possible.

FIG. 21A illustrates a conventional system bus computing system architecture 2100 wherein the components of the system are in electrical communication with each other using a bus 2105. Example system 2100 includes a processing unit (CPU or processor) 2110 and a system bus 2105 that couples various system components including the system memory 2115, such as read only memory (ROM) 2120 and random access memory (RAM) 2125, to the processor 2110. The system 2100 can include a cache of high-speed memory connected directly with, in close proximity to, or integrated as part of the processor 2110. The system 2100 can copy data from the memory 2115 and/or the storage device 2130 to the cache 2112 for quick access by the processor 2110. In this way, the cache can provide a performance boost that avoids processor 2110 delays while waiting for data. These and other modules can control or be configured to control the processor 2110 to perform various actions. Other system memory 2115 may be available for use as well. The memory 2115 can include multiple different types of memory with different performance characteristics. The processor 2110 can include any general purpose processor and a hardware module or software module, such as module 1 2132, module 2 2134, and module 3 2136 stored in storage device 2130, configured to control the processor 2110 as well as a special-purpose processor where software instructions are incorporated into the actual processor design. The processor 2110 may essentially be a completely self-contained computing system, containing multiple cores or processors, a bus, memory controller, cache, etc. A multi-core processor may be symmetric or asymmetric.

To enable user interaction with the computing device 2100, an input device 2145 can represent any number of input mechanisms, such as a microphone for speech, a touch-sensitive screen for gesture or graphical input, keyboard, mouse, motion input, speech and so forth. An output device 2135 can also be one or more of a number of output mechanisms known to those of skill in the art. In some instances, multimodal systems can enable a user to provide multiple types of input to communicate with the computing device 2100. The communications interface 2140 can generally govern and manage the user input and system output. There is no restriction on operating on any particular hardware arrangement and therefore the basic features here may easily be substituted for improved hardware or firmware arrangements as they are developed.

Storage device 2130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 2125, read only memory (ROM) 2120, and hybrids thereof.

The storage device 2130 can include software modules 2132, 2134, 2136 for controlling the processor 2110. Other hardware or software modules are contemplated. The storage device 2130 can be connected to the system bus 2105. In one aspect, a hardware module that performs a particular function can include the software component stored in a computer-readable medium in connection with the necessary hardware components, such as the processor 2110, bus 2105, display 2135, and so forth, to carry out the function.

FIG. 21B illustrates a computer system 2150 having a chipset architecture that can be used in executing the described method and generating and displaying a graphical user interface (GUI). Computer system 2150 is an example of computer hardware, software, and firmware that can be used to implement the disclosed technology. System 2150 can include a processor 2110, representative of any number of physically and/or logically distinct resources capable of executing software, firmware, and hardware configured to perform identified computations. Processor 2110 can communicate with a chipset 2160 that can control input to and output from processor 2110. In this example, chipset 2160 outputs information to output 2165, such as a display, and can read and write information to storage device 2170, which can include magnetic media, and solid state media, for example. Chipset 2160 can also read data from and write data to RAM 2175. A bridge 2180 for interfacing with a variety of user interface components 2185 can be provided for interfacing with chipset 2160. Such user interface components 2185 can include a keyboard, a microphone, touch detection and processing circuitry, a pointing device, such as a mouse, and so on. In general, inputs to system 2150 can come from any of a variety of sources, machine generated and/or human generated.

Chipset 2160 can also interface with one or more communication interfaces 2190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 2110 analyzing data stored in storage 2170 or 2175. Further, the machine can receive inputs from a user via user interface components 2185 and execute appropriate functions, such as browsing functions by interpreting these inputs using processor 2110.

It can be appreciated that example systems 2100 and 2150 can have more than one processor 2110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   receiving, by a client device, a user selection of a first project folder managed by a content management system;
   responsive to receiving the user selection, requesting, by the client device from the content management system, first project data associated with a first project, the first project data comprising content items, comments, and tasks associated with the first project;

presenting, by the client device, a first project folder view that includes representations of the content items, the comments, and the tasks associated with the first project;

receiving, by the client device, a second user selection of a second project folder managed by the content management system;

responsive to receiving the user selection, requesting, by the client device from the content management system, second project data associated with a second project, the second project data comprising second content items, second comments, and second tasks associated with the second project; and presenting, by the client device, a second project folder view that includes second representations of the second content items, the second comments, and the second tasks associated with the second project.

2. The method of claim 1, further comprising:
responsive to receiving the user selection, identifying, by the client device, additional first project data from a local project folder stored on the client device.

3. The method of claim 1, wherein the first project folder view comprises graphical elements selectable for accessing the content items, the comments, and the tasks associated with the first project.

4. The method of claim 1, wherein requesting, by the client device from the content management system, the first project data associated with the first project comprises:
requesting the first project data from one or more remote databases associated with the content management system.

5. The method of claim 4, further comprising:
receiving a first content item associated with the first project from the content management system; and
receiving a first set of comments associated with the first content item from a comment database of the one or more remote databases.

6. The method of claim 4, further comprising:
receiving a first content item associated with the first project from the content management system; and
receiving a first set of tasks associated with the first content item from a task database of the one or more remote databases.

7. The method of claim 1, further comprising:
detecting, by the client device, a modification to a first content item associated with the first project; and
based on the detecting, synchronizing, by the client device, the modification to the first content item with the content management system.

8. A method comprising:
receiving, by a content management system from a client device, a request to access a first project folder managed by the content management system;
responsive to receiving the request, obtaining, by the content management system, first project data associated with a first project, the first project data comprising content items, comments, and tasks associated with the first project;
generating, by the content management system, a first project folder view that comprises representations of the content items, the comments, and the tasks associated with the first project;
causing, by the content management system, the client device to present the first project folder view on a display of the client device;

receiving, by the content management system from the client device, a second request to access a second project folder managed by the content management system;

responsive to receiving the request, obtaining, by the content management system, second project data associated with a second project, the second project data comprising second content items, second comments, and second tasks associated with the second project;

generating, by the content management system, a second project folder view that comprises second representations of the second content items, the second comments, and the second tasks associated with the second project; and causing, by the content management system, the client device to present the second project folder view on the display of the client device.

9. The method of claim 8, wherein the first project folder view comprises graphical elements selectable for accessing the content items, the comments, and the tasks associated with the first project.

10. The method of claim 8, wherein obtaining, by the content management system, the first project data associated with the first project comprises:
obtaining the first project data from one or more remote databases associated with the content management system.

11. The method of claim 10, further comprising:
obtaining a first content item associated with the first project; and
obtaining a first set of comments associated with the first content item from a comment database of the one or more remote databases.

12. The method of claim 10, further comprising:
obtaining a first content item associated with the first project; and
obtaining a first set of tasks associated with the first content item from a task database of the one or more remote databases.

13. The method of claim 8, further comprising:
receiving, from the client device, data related to a modification event of a first content item at the client device; and
synchronizing, by the content management system, the data in the modification event with a version of the first content item managed by the content management system.

14. A non-transitory computer readable medium comprising one or more sequences of instructions, when, when executed by one or more processors, causes a computing system to perform operations, comprising:
receiving, by the computing system, a user selection of a first project folder for presenting first project data corresponding to a first project;
responsive to receiving the user selection, obtaining, by the computing system, the first project data associated with the first project, the first project data comprising content items, comments, and tasks associated with the first project;
causing, by the computing system, presentation of a first project folder view that includes representations of the content items, the comments, and the tasks associated with the first project;
receiving, by the computing system a second user selection of a second project folder for presenting second project data corresponding to a second project;

responsive to receiving the user selection, obtaining, by the computing system, the second project data associated with the second project, the second project data comprising second content items, second comments, and second tasks associated with the second project; and causing, by the computing system, presentation of a second project folder view that includes second representations of the second content items, the second comments, and the second tasks associated with the second project.

15. The non-transitory computer readable medium of claim 14, further comprising:
responsive to receiving the user selection, identifying, by the computing system, additional first project data from a local project folder stored on the computing system.

16. The non-transitory computer readable medium of claim 14, wherein the first project folder view comprises graphical elements selectable for accessing the content items, the comments, and the tasks associated with the first project.

17. The non-transitory computer readable medium of claim 14, wherein obtaining, by the computing system, the first project data associated with the first project comprises:
requesting the first project data from one or more remote databases.

18. The non-transitory computer readable medium of claim 17, further comprising:
obtaining a first content item associated with the first project; and
obtaining a first set of comments associated with the first content item from a comment database of the one or more remote databases.

19. The non-transitory computer readable medium of claim 17, further comprising:
obtaining a first content item associated with the first project; and
obtaining a first set of tasks associated with the first content item from a task database of the one or more remote databases.

20. The non-transitory computer readable medium of claim 17, further comprising:
identifying, by the computing system, a modification to a first content item associated with the first project; and
based on the identifying, synchronizing, by the computing system, the modification to the first content item with the one or more remote databases.

\* \* \* \* \*